(12) United States Patent
Burrows

(10) Patent No.: US 6,963,869 B2
(45) Date of Patent: Nov. 8, 2005

(54) SYSTEM AND METHOD FOR SEARCH, INDEX, PARSING DOCUMENT DATABASE INCLUDING SUBJECT DOCUMENT HAVING NESTED FIELDS ASSOCIATED START AND END META WORDS WHERE EACH META WORD IDENTIFY LOCATION AND NESTING LEVEL

(75) Inventor: Michael Burrows, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/042,028

(22) Filed: Jan. 7, 2002

(65) Prior Publication Data

US 2003/0140035 A1 Jul. 24, 2003

(51) Int. Cl.$^7$ ............................................. G06F 17/30
(52) U.S. Cl. ........................... 707/4; 707/100; 715/514
(58) Field of Search ...................... 707/1–10, 100–102, 707/104–104.1, 200–202; 715/510–514, 501.1; 706/45–50; 709/203–215

(56) References Cited

U.S. PATENT DOCUMENTS

| | | | | |
|---|---|---|---|---|
| 5,544,049 A | * | 8/1996 | Henderson et al. ............. | 704/7 |
| 5,761,497 A | * | 6/1998 | Holt et al. ...................... | 707/5 |
| 5,983,216 A | * | 11/1999 | Kirsch et al. ................... | 707/2 |
| 6,021,409 A | * | 2/2000 | Burrows ..................... | 707/102 |
| 6,360,215 B1 | * | 3/2002 | Judd et al. ..................... | 707/3 |
| 6,449,627 B1 | * | 9/2002 | Baer et al. ................... | 715/514 |
| 6,510,425 B1 | * | 1/2003 | Okamoto et al. .............. | 707/3 |
| 6,516,337 B1 | * | 2/2003 | Tripp et al. ................. | 709/202 |
| 6,519,597 B1 | * | 2/2003 | Cheng et al. ................ | 707/10 |
| 6,567,800 B1 | * | 5/2003 | Barrera et al. ................ | 707/3 |
| 6,611,840 B1 | * | 8/2003 | Baer et al. ................ | 707/102 |

(Continued)

FOREIGN PATENT DOCUMENTS

| | | | | | |
|---|---|---|---|---|---|
| GB | 2385158 A | * | 8/2003 | ..................... | 17/30 |
| GB | 2394800 A | * | 5/2004 | ..................... | 17/30 |
| WO | WO 01/11559 A1 | * | 2/2001 | | |
| WO | WO 01/67378 | * | 9/2001 | | |

OTHER PUBLICATIONS

Rupali Sharma et al. "Phrase–based text representation for managing the web documents", proceedings of the international conference on information technology, computers and communications ITCC'03, Apr. 2003, pp 165–169.*

(Continued)

*Primary Examiner*—Srirama Channavajjala

(57) ABSTRACT

An indexer indexes a database of documents, and a search engine searches the database of documents. Nesting level information stored in index entries is used to identify, and match together, start and end meta words comprising fields at assorted nesting levels within a document. Based on a query specifying words to be found within fields, spatial criteria are applied to the identified meta words to determine if the specified words are found within the specified fields. A subset of the documents have nested fields, and each nested field has an associated start meta word and end meta word. Each meta word has an associated nesting level. Each document is indexed by parsing the document to determine locations within the document of words and meta words, as well as the nesting level associated with each meta word. An index is generated that has word entries, meta word entries, and generic meta word entries. The meta word entries indicate locations within the documents of an identified meta word, as well as the nesting level of the meta word. The generic meta word entries identify locations within the document of a class of meta words, including meta words at all nesting levels of the meta words within the document. For each identified location within the generic meta word entry, the generic meta word entry also includes nesting level information associated with the meta word at the identified location.

65 Claims, 9 Drawing Sheets

U.S. PATENT DOCUMENTS

| | | | |
|---|---|---|---|
| 6,625,596 B1 * | 9/2003 | Nunez | 707/3 |
| 6,665,666 B1 * | 12/2003 | Brown et al. | 707/5 |
| 6,678,694 B1 * | 1/2004 | Zimmermann et al. | 707/102 |
| 6,701,307 B2 * | 3/2004 | Himmelstein et al. | 707/3 |
| 6,738,765 B1 * | 5/2004 | Wakefield et al. | 707/5 |
| 6,766,316 B2 * | 7/2004 | Caudill et al. | 707/3 |
| 2002/0078035 A1 * | 6/2002 | Frank et al. | 707/3 |
| 2002/0078152 A1 * | 6/2002 | Boone | 709/204 |
| 2002/0129058 A1 * | 9/2002 | Story et al. | 707/513 |
| 2002/0129062 A1 * | 9/2002 | Luparello | 707/513 |
| 2003/0182274 A1 * | 9/2003 | Oh | 707/3 |

OTHER PUBLICATIONS

Julian Cabrera, et al. "generic metadata browsing system for multimedia document retrieval", Multimedia signal processing, 1999 IEEE 3rd workshop, Sep. 1999, pp 83–88.*

Nigel Hinds et al. "managing metadata for distributed information servers", system sciences, 1998, proceddings of the thirty–first Hawai conference, Jan. 1998, vol. 4, pp 513–522.*

Yong Kyu Lee et al. "index structures for structured documents", 1996 ACM, pp 91–99.*

Khalid Al–Kofahi et al. "combining multiple classifiers for text categorization", CIKM '01, Nov. 2001, ACM, pp 97–104.*

Kai Halttunen, "Search services: HotBot", last updated: Mar. 9, 1996, 6 pages.*

Kimberly McCoy, "I'm Finally On–Line, Now What?", search engines, subject directories, and meta–search engines, Winte 2000 The OLRC news, vol. 5, No. 1, 4 pages.*

* cited by examiner

Applying first
spatial criteria
416

Determine the closest location, out of the identified locations for the first class of meta words, to the identified location of the specified words — 502

Selecting a first
meta word
418

Select a first meta word from the first class of meta words corresponding to the determined closest location — 504

FIG. 5A

Applying first
spatial criteria
430

Determine the closest location, out of the identified locations for the second class of meta words, to the determined closest location for the first class of meta words — 506

Selecting a second
meta word
432

Select a second meta word from the second class of meta words corresponding to the determined closest location — 508

FIG. 5B

Searching the index to determine a location for the first identified complementary meta word
424

Search the index to determine a closest complementary location of the first identified complementary meta word with respect to the identified location corresponding to the first selected meta word — 602

FIG. 6A

Searching the index to determine a location for the second identified complementary meta word
438

Search the index to determine a closest complementary location of the second identified complementary word with respect to the identified location corresponding to the second selected meta word — 604

FIG. 6B

Applying second spatial criteria
426

Determine whether the identified location of the specified words falls between: — 702
a) the determined location for the first identified complementary meta word, and
b) the determined closest location of the first class of meta words

FIG. 7A

Applying second spatial criteria
440

Determine whether the determined location for the first identified complementary meta word falls between: — 704
a) the determined location for the second identified complementary meta word, and
b) the identified location of the specified words

FIG. 7B

SYSTEM AND METHOD FOR SEARCH, INDEX, PARSING DOCUMENT DATABASE INCLUDING SUBJECT DOCUMENT HAVING NESTED FIELDS ASSOCIATED START AND END META WORDS WHERE EACH META WORD IDENTIFY LOCATION AND NESTING LEVEL

The present invention relates generally to text indexing and searching, and particularly to indexing and searching highly-structured text with nested fields.

BACKGROUND OF THE INVENTION

XML, or eXtensible Markup Language, provides additional features over HTML (Hyper-Text Markup Language). XML allows data to be put in various contexts, by allowing specific markup commands and descriptors to be created for specific data. In contrast, HTML only uses a limited number of set markup commands, which are primarily used to affect the look and positioning of text in a document. With XML, the idea is to make data self-identifying, by associating descriptive markup commands, also known as meta tags or meta words, with the data. For example, an entry of <patient-name>NAME</patient-name> in a record would be recognizable as a patient's name. A medical computer receiving a document could be programmed to search for a patient's name by looking for the meta word <patient-name>, and then, for example, adding or updating the associated patient's name in its database as appropriate.

One of the basic uses of this type of functionality is to associate text with the type of structure, or field, in which it is found—for example, a title, abstract, body, paragraph, table, list, and the like. By allowing these associations, complex text structures having multiple levels can be achieved. For example, portions of text can be associated with meta words indicating that text is found within a paragraph that is within a list that is within another paragraph. One advantage of associating text with fields is that searches for terms within specific types of fields can be done easily and quickly. Because the beginning and ending of each paragraph, title, abstract, and the like are stored as meta words in each document, it is easy to quickly find instances of terms that fall within, for example, a title. This is a powerful tool for conducting searches, and can be expected to play a larger role in future search engines for the World Wide Web. In general, commercially-available search engines for the Web do not currently search on meta words stored in documents written in XML.

A typical search engine is AltaVista's ni2, described in part by U.S. Pat. No. 5,832,500, the contents of which are hereby incorporated by reference. The ni2 search engine searches an index created from a database of records, and has the ability to search for words and meta words. A typical index has entries for each indexable word and meta word in a document, together with the associated locations for each word and meta word.

One particular problem that arises from searching for text associated with certain meta words occurs when text contains multiple fields of the same type that overlap or enclose each other. As an example of this type of problem, consider a simple example of a search conducted on a document that has the following structure, where meta words are in brackets and "Par" means paragraph:

<ParBegin><ParBegin><ParEnd>Blue<ParEnd>

If a search engine were queried as to whether this document has an instance of the word "Blue" within a paragraph, it would first find an example of a ParEnd meta word just past the location of the word Blue, and assume this is a meta word representing the end of a paragraph field. It would then search the locations immediately preceding the last ParEnd, revealing another ParEnd meta word just before the word Blue. Continuing toward the front of the document, the search engine would next identify an instance of a ParBegin meta word. The search engine might associate this ParBegin meta word with the ParEnd meta word adjacent to it, on the left side of Blue, and thereby inaccurately report back that Blue is not within a paragraph. Or, the search engine might not know which of the two ParEnd meta words correlates to the ParBegin meta word, and return an error. Or, it might assume that one of the two ParEnd meta words is a mistake and, not knowing which is which, also report an error back under these circumstances.

The problem in the example is that the search engine does not know which ParEnd meta word is associated with the ParBegin meta word closest to the word Blue. In reality, the two ParEnd meta words are at different "nesting levels." The first ParBegin and the last ParEnd in the document constitute one paragraph field, which is at a predetermined nesting level—for example, nesting level zero. Then, nested within this first paragraph field at nesting level zero is another paragraph field at nesting level one, bounded by the ParBegin and ParEnd meta words in the middle of the document. In any given document, there may be many different nesting levels of many different types of fields.

One way of overcoming the problem of nested fields is, when creating the index, to parse the document into each separate field, and to index separately all the text stored within each field. However, this leads to duplication, because fields may overlap and different fields will then contain the same text. Thus, this solution is expensive in terms of data storage requirements, as well as time-consuming for indexing and searching purposes. Another approach is to have the search engine, when searching an index for a particular field, not jump around but instead read the index sequentially from the start of a document, keeping track of the various fields, both the start and end point, as they appear. However, this is inefficient and requires significant computational resources to process queries. A more pragmatic solution is simply to disallow searching on fields within fields of the same name—a tact taken by the current version of ni2.

Thus, it would be desirable to provide a method for indexing a database of documents that contains entries having nesting level information associated with the meta words so that fields nested within fields could be quickly and effectively searched.

It would also be desirable to provide a method for indexing a database of documents that stores easily searchable meta words and associated nesting level information with minimal duplication, thereby minimizing the need for valuable memory resources.

Additionally, it would be desirable to provide a method for searching a database of documents that can identify, quickly and effectively, the nesting levels of the meta words closest to the text desired to be searched.

It would further be desirable to provide a method for searching a database of documents that can search all nesting levels of a particular type of field in a document in a sequential and direct manner.

SUMMARY OF THE INVENTION

In summary, the invention is a computer-implemented method for indexing a database of documents, and a computer-implemented method for searching the database of documents. The invention uses nesting level information stored in index entries to identify, and match together, start and end meta words comprising fields at assorted nesting levels within a document. Based on a query specifying words to be found within fields, spatial criteria are applied to the identified meta words to determine if the specified words are found within the specified fields.

In one embodiment, the present invention is a computer-implemented method for indexing a database of documents. A subset of the documents have nested fields, and each nested field has an associated start meta word and end meta word. Each meta word has an associated nesting level. The present invention indexes each document by parsing the document to determine locations within the document of words and meta words, as well as the nesting level associated with each meta word. It also generates an index that has word entries, meta word entries, and generic meta word entries. The word entries identify locations within the documents of identified words. The meta word entries indicate locations within the documents of identified meta words, as well as the nesting levels of the meta words. Each generic meta word entries identify locations within the document of a class of meta words, including meta words at all nesting levels of the meta words within the document. For each identified location within the generic meta word entry, the generic meta word entry also includes nesting level information associated with the meta word at the identified location.

In other embodiments, the present invention is a computer-implemented method for searching a database of documents. A subset of the documents have nested fields, and each nested field has an associated start meta word and end meta word. Each meta word has an associated nesting level. In one such embodiment, the method receives a query that specifies one or more words to be found within a specified field within a document. It then determines a start meta word and an end meta word associated with the specified field, and searches an index to identify locations of the specified words, as well as locations of a class of meta words that includes the start or end meta word associated with the specified field. It then applies a first type of spatial criteria to the identified locations of the class of meta words with respect to the identified location of the specified words, using this result to select a meta word from the class of meta words. The method invention then determines the nesting level of this selected meta word. Next, it identifies a complementary meta word corresponding to the selected meta word, and searches the index to determine a location for the complementary meta word. Finally, it applies a second type of spatial criteria to the identified location for the specified words and to the determined location for the complementary meta word, using this result to generate a result that indicates whether the specified words are found within the specified field.

In another such embodiment, a search engine in a computer system receives a query that specifies one or more words to be found within a first specified field, that is found within a second specified field. The search engine determines first start and end meta words associated with the first specified field, and determines second start and end meta words associated with the second specified field. It searches an index to identify locations of the specified words, locations of a first class of meta words that includes the first start or end meta word associated with the first field, and locations of a second class of meta words that includes the second start or end meta word associated with the second field. Then, it applies a first type of spatial criteria, determined at least in part from the original query, to the identified locations of the first and second classes of meta words, and to the location of the specified words, to select both a first meta word from the first class of meta words, and a second meta word from the second class of meta words.

Next, the search engine determines the nesting levels of the first and second selected meta words. Then, it identifies first and second complementary meta words, corresponding to the first and second selected meta words, and searches the index to determine the locations for the first and second complementary meta words. Finally, the search engine applies a second type of spatial criteria, determined from the received query, to the identified locations of the specified words and to the determined locations of the first and second complementary meta words. Using that result, the search engine generates a result that indicates whether the specified words are found within an instance of the first specified field that is found within an instance of the second specified field.

BRIEF DESCRIPTION OF THE DRAWINGS

Additional objects and features of the invention will be more readily apparent from the following detailed description and appended claims when taken in conjunction with the drawings, in which:

FIGS. 5A–B, 6A–B, and 7A–B provide further detail on some of the steps in the flowchart of FIGS. 4A–4C.

DESCRIPTION OF THE PREFERRED EMBODIMENTS

Generally, the invention presents an inventive approach to storing and searching meta words that include nesting level information. While in some instances, it is appropriate to store the nesting level directly with a meta word in a database index entry, this does not provide a search engine any information on what nesting level to "jump to" in a document when beginning a search. In other words, in a highly-structured text document with multiple nesting levels for multiple types of fields, a search engine would not know the nesting level at which to begin searching for encompassing fields. The invention overcomes this problem by indexing not only meta words with their associated nesting levels, but also classes of meta words, which include all of the locations of a particular type of meta word at all nesting levels.

The invention uses these "generic" meta word entries of classes of meta words in the index to search for an instance of the closest location of a meta word, without regard to the nesting level of the meta word. The search engine only needs to know the general type of meta word to search for, and the location of the specified words or fields to compare against the locations of the class of meta words. After the closest location of an appropriate meta word is determined, the invention uses an algorithm to decode nesting level information that is stored in or with the location value for that meta word. At this point, the search engine knows the appropriate nesting level to search for, and it can find the complementary meta word directly by finding the index entry for that meta word at that nesting level. After identifying the closest location of the complementary meta word at the appropriate nesting level, the invention can then determine whether the meta word being searched and its complement encompass the specified words or fields.

Figure 1:
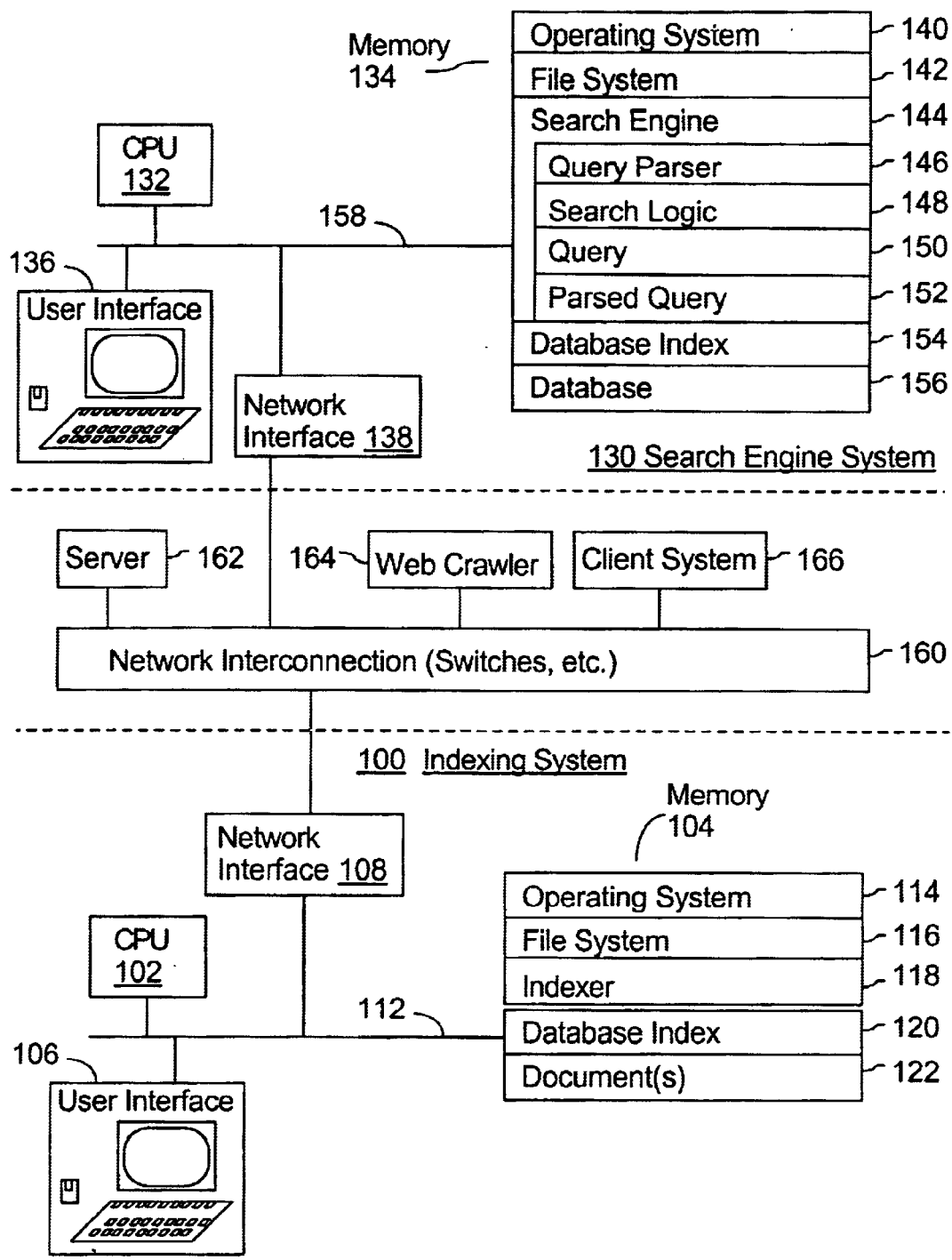
FIG. 1 is a logical block diagram of a general computer system, including a search engine system and an indexing system, connected to a network, which may practice the present invention.

Referring to FIG. 1, a computer system capable of practicing the present invention is shown. The computer system includes an indexing system 100 and a search engine system 130 which, while shown as separate systems connected by a network 160, may also comprise a single system. Indexing system 100 generates an index of a database that search engine system 130 uses to search the database, so it is not necessary that the systems be physically separate.

Indexing system 100 contains one or more central processing units (CPU) 102, memory 104 (including high speed random access memory, and non-volatile memory such as disk storage), an optional user interface 106, and a network interface or other communications interface 108 for connecting the indexing system 100 to search engine 130, server 162, web crawler 164, and/or client devices 166 via the network interconnection 160. The components of indexing system 100 are interconnected by one or more system busses 112. The memory 104 typically stores an operating system 114, file system 116, indexer 118, database index 120, and document(s) 122.

Search engine system 130 similarly contains one or more CPUs 132, memory 134 (including high speed random access memory, and non-volatile memory such as disk storage), an optional user interface 136, and a network interface or other communications interface 138 for connecting the search engine system 130 to the indexing system 100, server 162, web crawler 164, and/or client devices 166 via the network interconnection 160. The components of the search engine system 130 are interconnected by one or more system busses 158. The memory 134 typically stores an operating system 140, file system 142, search engine 144, database index 154, and database 156. The search engine 144 typically contains query parser 146 for parsing a query 150 into a parsed query 152, and search logic 148.

Network interconnection 160 may connect indexing system 100 and search engine system 130 to an intranet, such as a local-area network (LAN), a wide-area network (WAN), or the Internet. If the systems are connected to the Internet, and indexing system 100 and search engine system 130 function as a search engine for the World Wide Web, web crawler 164 seeks out new web pages to be added to database of documents 122. Indexing system 100 creates an index of the web page documents that can be searched by search engine system 130. If indexing system 100 and search engine system 130 are separate systems to distribute system resources, for example, then it is desirable for indexing system 100 to replicate database index 120 and documents 122 to search engine system 130, stored as database index 154 and documents 156. This allows the search engine system 130 to search directly and locally on the index, and allows the search engine system to directly call out documents corresponding to listings in database index 154.

Referring to FIGS. 2A–2D, examples of entries 202 in database index 120 are shown (these entries also correspond to entries in database index 154). Different types of entries include word entries 212, meta word entries 214, and generic meta word entries 216. Each entry 202 includes at least an object identifier 204 and a location list 206. The object identifier is the portion of entry 202 containing the word or meta word that is actually being indexed, and location list 206 stores one or more locations of that word or meta word in one or more documents. For example, word entry 212 stores a word or words in the object identifier 204—the word "blue" in the example shown—and the locations of the word "blue" within a document, shown as locations 002, 016, and 021. Generally, the locations are relative positions from the start of a document at a specific location in memory. Thus, the word blue is found at positions 002, 016, and 021 of a specific document, for which the identity and location in the database of documents is stored elsewhere.

Because the database index 124 indicates the location of objects in all documents within the database, the location list 206 for each object must identify both the document and the location within the identified document for each instance of the object in the database. However, for ease of explanation of the present invention, and because the present application is primarily concerned with identifying content within nested fields in a document, the location list examples shown in FIGS. 2A–2D only show the locations of identified objects within a single document.

Meta word entries 214 have an object identifier 204 that contains a meta word. A meta word is data representing a particular context, for example, the beginning of a paragraph—"ParBegin"—in the example shown. In a structured text document containing meta words, the meta words themselves are stored at the specific locations in the document where they occur. Thus, a ParBegin meta word is logically stored adjacent to the first word at the beginning of a paragraph. Location list 206 for each meta word entry 214 shows one or more locations of each meta word.

In one embodiment of the present invention, the meta word stored in object identifier 204 for each meta word entry 214 also stores the nesting level associated with each meta word. For example, if a document contains a block quotation constituting a paragraph, nested within the first paragraph of a document, then the meta word denoting the beginning of the first paragraph would be at nesting level 0, and the meta word denoting the beginning of the block quote paragraph would be at nesting level 1. This nesting level is stored in the object identifier 204 along with the meta word itself. This is demonstrated in FIG. 2C, which shows ParBegin0, indicating a ParBegin meta word at nesting level 0, and ParBegin1, which indicates a ParBegin meta word at nesting level 1.

Figure 2A:
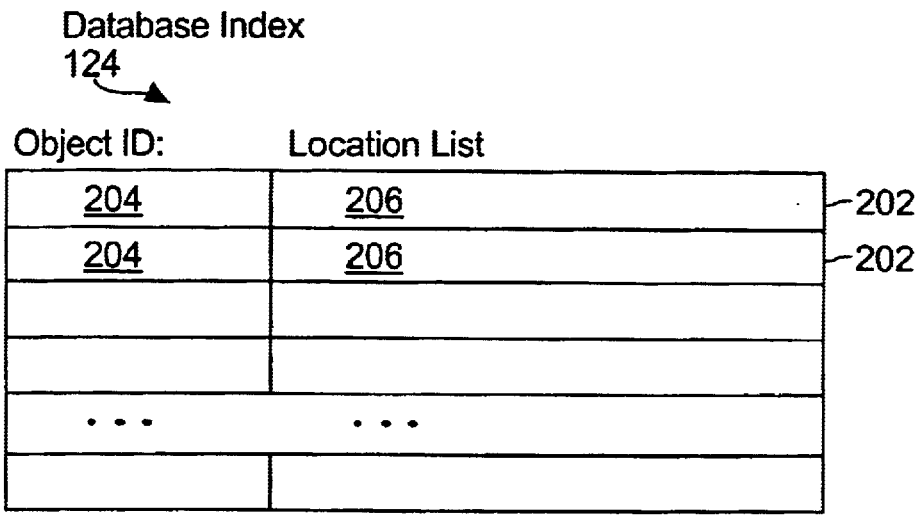
FIGS. 2A–2D depict entries in a database index, including word entries, meta word entries, and generic meta word entries.
Figure 2B:
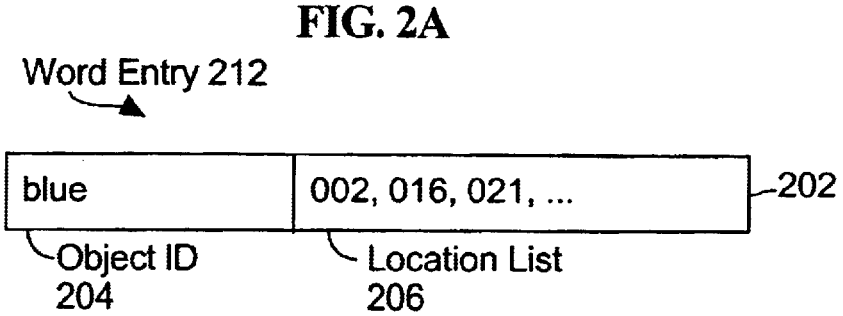
Figure 2C:
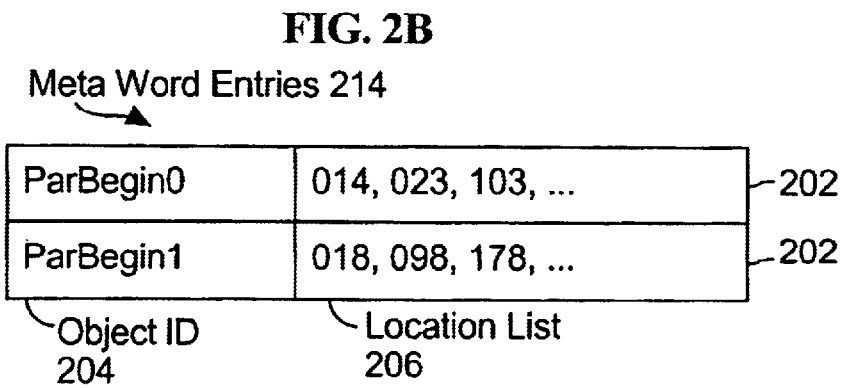
Figure 2D:
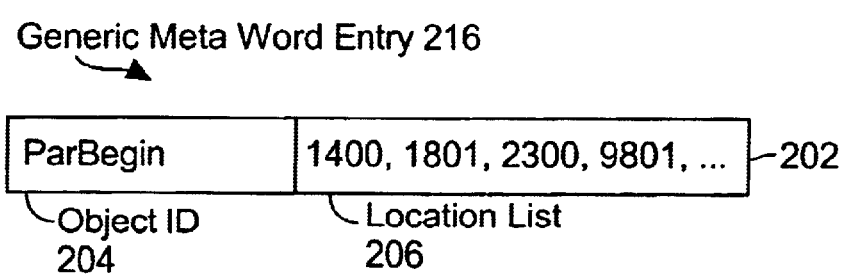

For generic meta word entry 216, the object identifier 204 also contains a meta word. However, the object identifier of a generic meta word entry does not contain a meta word entry at a specific nesting level, but rather a generic meta word representing a class of meta words that may be found at various nesting levels throughout a document. Thus, as shown in FIG. 2D, the object identifier of generic meta word entry 216 is ParBegin, which represents a class of meta words including ParBegin0 and ParBegin 1 of FIG. 2C. The location list for a generic meta word entry includes the locations of all meta words in the class of meta words. Thus, for generic meta word entry 216, location list 206 indicates the locations of ParBegin0 and ParBegin1 shown in the corresponding meta word entries 214. However, for one embodiment of the present invention, the location list also contains nesting level information for each occurrence of each meta word in the class of meta words at each location.

It does so by mathematically combining the location itself with the nesting level. In the embodiment of the present invention shown in FIG. 2D, this is accomplished by multiplying the location of each meta word by 100 and adding the nesting level. Thus, the first position of ParBegin0 is 1400, because 014*100+0 (the nesting level)=1400. Similarly, the first position of ParBegin1 is 1801, because 018*100+1 (the nesting level)=1801.

Indexing

Figure 3:
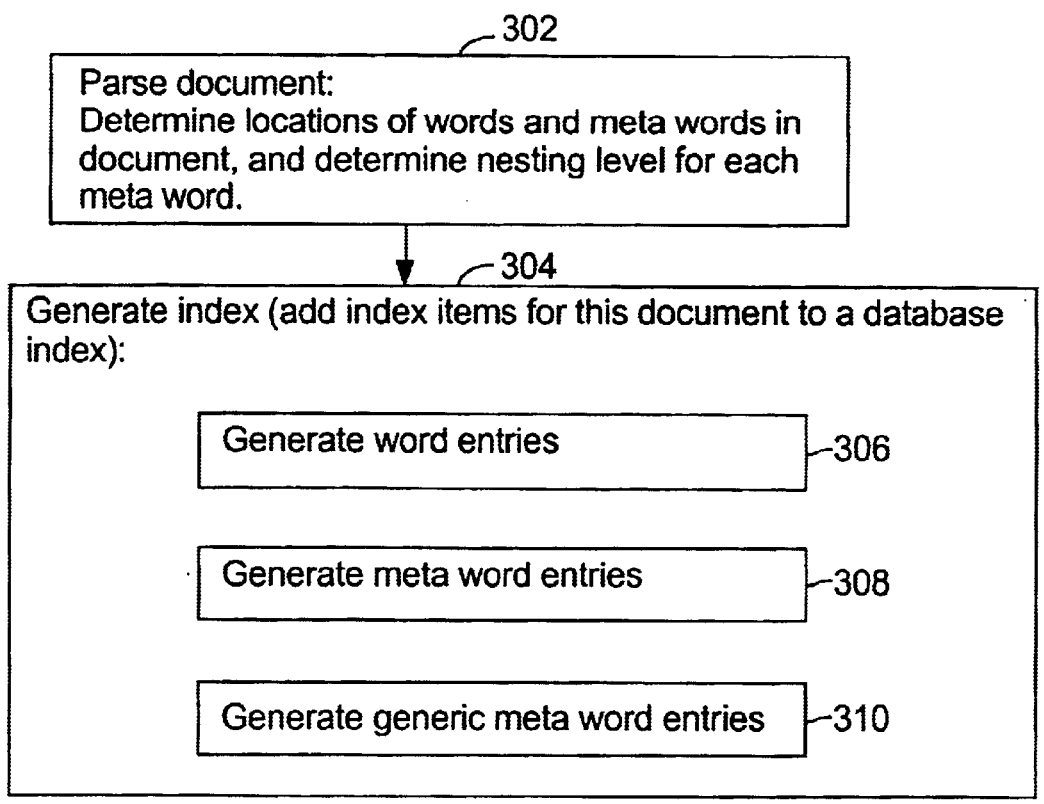
FIG. 3 is a flow chart of a method for indexing a database of documents in accordance with one embodiment of the present invention.

Turning to FIG. 3, a method of indexing a database of documents in accordance with one embodiment of the present invention is shown. Prior to beginning this method, the indexer obtains or accesses a new document for indexing. In one embodiment, this may occur when web crawler 164 finds a new web page to index. As a simple illustration, assume that the indexer is indexing a document having the following words and meta words in the following order (meta words are in brackets):

<ParBegin>Colors<ParBegin>Primary<ListBegin>Red Green Blue<ListBegin>Navy Royal<ListEnd><ListEnd>Wavelength<ParEnd>Visible<ParEnd>.

The indexer of the present invention first parses the document into its constituent words and meta words in a collating order. In so doing, the parser determines the locations of words and meta words in the document, and determines nesting level information for each meta word (302). For example, for the illustrative document above, the document would be parsed into the words and meta words ParBegin, Colors, ParBegin, Primary, ListBegin, Red, Green, Blue, and so on. As part of the parsing process, the indexer determines the nesting level of each meta word as the document is sequentially scanned from beginning to end. It does this by finding, for each distinct meta word, the number of preceding unmatched "start" meta words of the same type in the document, and then assigning that number as the nesting level of the meta word. The first instance of a start meta word, such as ParBegin, in the beginning of the exemplary document described above, is assigned a nesting level of 0 because there are zero preceding unmatched start meta words of this type. The next sequential instance of ParBegin in the document will be assigned nesting level 1 (because there is one preceding unmatched start meta word of this type).

To properly identify the nesting level of every meta word in a document in one pass through the document, the indexer maintains a separate "unmatched start meta word" counter for each distinct type of meta word in the document. As meta words are encountered, they are assigned a nesting level equal to the counter value for that meta word type, and then the meta word is added to the index. In particular, whenever a "start" meta word is encountered, such as ParBegin or ListBegin, the meta word is assigned a nesting level equal to the current counter value for that meta word type, and then the counter for the meta word type is incremented by one. Whenever an "end" meta word is encountered, such as ParEnd or ListEnd, the counter value for the corresponding meta word type is decremented by one, and then the meta word is assigned a nesting level equal to that counter value. In a properly formed document, all meta words are matched pairs, such as ParBegin and ParEnd. If a document is not properly formed, for instance through the use of unmatched meta words, some or all of the meta word nesting information in the index for that particular document may be of little value.

In an alternate embodiment, the meta words of a document already indicate the nesting level of each meta word, and therefore the indexer does not need to determine the nesting level associated with each meta word of the document. In another embodiment, the numbering for the nesting levels for the meta words does not begin at the start or end of a document, but instead begins at other discernable start point(s) in the document. Also, the nesting level numbering does not need to start at 0, but can begin at some other preselected value.

Next, the present invention generates the database index (304), by generating word entries (306), meta word entries (308), and generic meta word entries (310). To create a word entry, the indexer stores an indexable word in the object identifier 204, and the locations that the word may be found at in the document in the location list 206. The locations are typically stored in increasing order, relative to a starting point of the parser in parsing a document, although they may also be stored in any other logical collating order such as decreasing order.

To generate a meta word entry (308), the indexer stores an indexable meta word in the object identifier 204 at a specific nesting level, and appends the nesting level for that meta word to the meta word itself. The location list 206 contains, generally in increasing order, all of the locations of the meta word at the specific nesting level denoted in the object identifier. There may be several locations of, for example, ParBegin1, because there may be multiple instances of a sub-paragraph positioned with a top level paragraph in a document.

To create a generic meta word entry (310), the indexer stores a generic meta word representing a class of meta words at all different nesting levels in the object identifier 204. To store the nesting level for each occurrence of each specific meta word in the class of meta words, in one embodiment, the indexer multiplies each location by a selected value, for example 100, and then adds in the nesting level, before storing these values in the location list 206 of the meta word entry. Then, when a search engine reads out the locations for a generic meta word entry, it can retrieve both the location and nesting level information for each meta word in the class of meta words represented by this entry by reversing the mathematical procedure. Because, in one embodiment of the present invention, the location for a meta word at a specific nesting level is stored as both a meta word entry and also as part of the class of meta words stored in a generic meta word entry, there is some overlap in the storage of meta words. However, this overlap is purposeful and is part of one embodiment of the method of searching a database of documents, discussed hereafter.

Parsing step 302 and indexing step 304 may be performed together. That is, a document may be parsed in a single pass through the document and, at the same time, the index entries for the document may be generated. In one implementation, the index entries for either one document or a small set of documents are generated while parsing the document or documents, and then the resulting index entries are merged into the main index of the indexing system.

In one embodiment, the indexer stores the word entries, meta word entries, and generic word entries alphanumerically in the database so that simple search logic on the object identifiers of the database entries can quickly locate the desired entry. The location list for the entries may also include additional information indicating what document(s) in the database the locations correspond to, or each database index entry may include an additional record, in addition to the object identifier and the location list, indicating what document(s) it corresponds to. In another embodiment, no additional information pertaining to the particular document is necessary because all locations are relative to the starting point of the first document.

For the given example, the method of indexing the document of the present invention would result in the following database index entries (the type of database entry is not part of the actual database index entry, and is only provided for purposes of illustration):

| Object Identifier | Location List | (Type of database entry) |
|---|---|---|
| Blue | 008 | (word entry) |
| Colors | 002 | (word entry) |
| Green | 007 | (word entry) |
| ListBegin | 500, 901 | (generic meta word entry) |
| ListBegin0 | 005 | (meta word entry) |
| ListBegin1 | 009 | (meta word entry) |
| ListEnd | 1201, 1300 | (generic meta word entry) |
| ListEnd0 | 013 | (meta word entry) |
| ListEnd1 | 012 | (meta word entry) |
| Navy | 010 | (word entry) |
| ParBegin | 100, 301 | (generic meta word entry) |
| ParBegin0 | 001 | (meta word entry) |
| ParBegin1 | 003 | (meta word entry) |
| ParEnd | 1501, 1700 | (generic meta word entry) |
| ParEnd0 | 017 | (meta word entry) |
| ParEnd1 | 015 | (meta word entry) |
| Primary | 004 | (word entry) |
| Red | 006 | (word entry) |
| Royal | 011 | (word entry) |
| Wavelength | 014 | (word entry) |
| Visible | 016 | (word entry) |

For this simplified illustration, no document identifier, or location of the document in the database of documents, is provided. All locations are relative to the start of the single document.

Figure 4A:
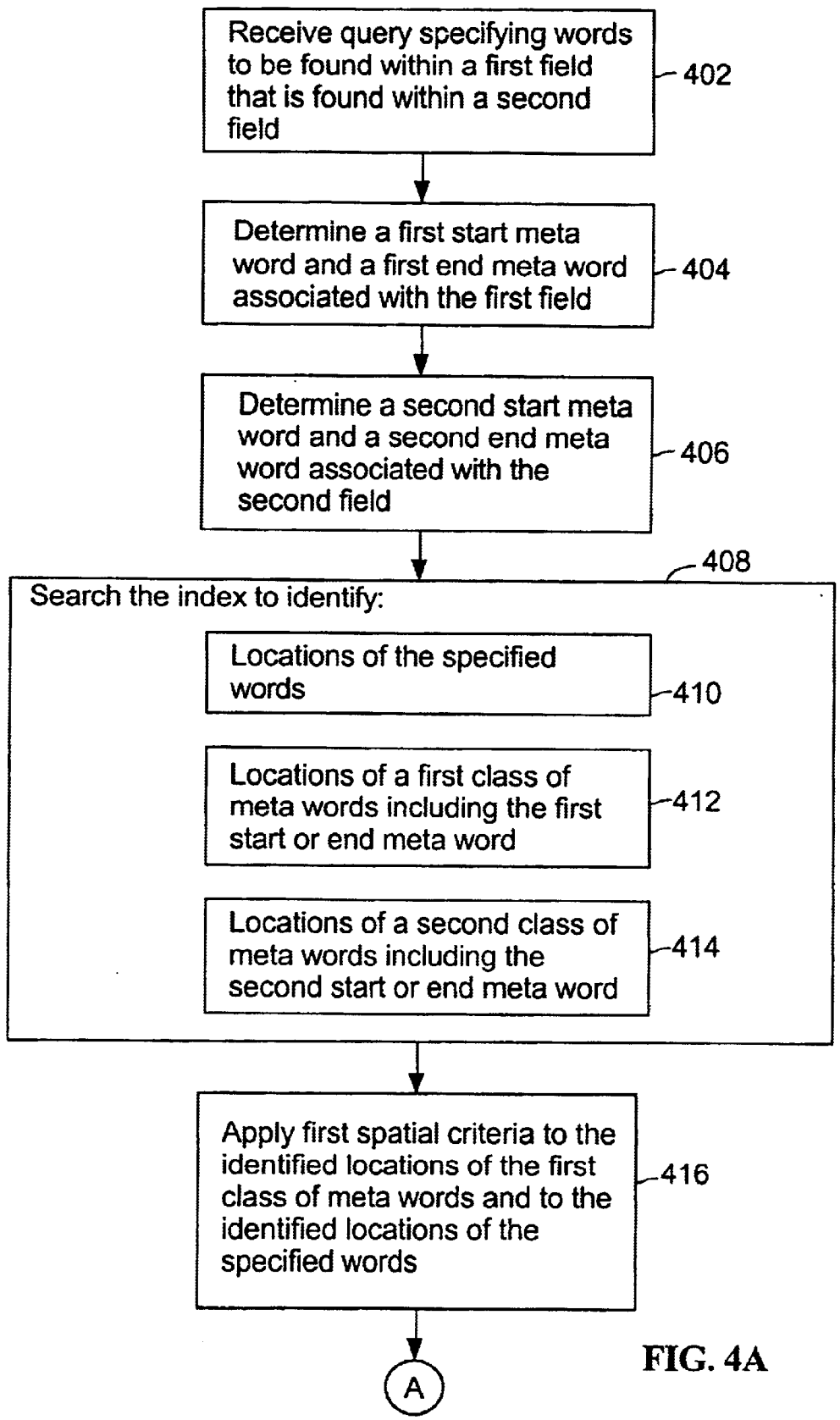
FIGS. 4A–4C are a flow chart of a method for searching a database of documents, and in particular for searching for specified words to be found within multiple fields, in accordance with one embodiment of the present invention.

Referring to FIG. 4A., a method for searching a database of documents to find text within a nested field (i.e., a field within a field) is shown. For purposes of this invention, a "nested field" is any field found within another field, whether or not the fields are the same type of field. To illustrate the inventive method, both a straightforward search and a more complicated search are explained below.

Straightforward Search Example

To understand a straightforward search, assume, for purposes of illustration, that a user wants to find an instance of the term "navy" within a list within a paragraph in a database containing the illustrative document indexed above.

First, a search engine implementing the present invention receives a query that specifies one or more words to be found within a first field, which is found within a second field (402). In this example, the specified word is "navy," the first field is a list, and the second field is a paragraph. Next, the search engine determines a first start meta word and a first end meta field associated with the first field (404). In the example, the first start meta word would be ListBegin, and the first end meta word would be ListEnd. The search engine then determines a second start meta word and a second end meta word associated with the second field (406).

In the example, the second start meta word would be ParBegin, and the second end meta word would be ParEnd.

Next, the search engine searches the index to identify the locations of several different entries (408). The search engine searches the index to identify locations of the specified words, i.e. "navy" (410). It does so by finding a word entry 212 having an object identifier 204 corresponding to the word navy, which is the tenth entry in the illustrative database index above. The location list 206 for that word entry contains the locations of the term navy in the document, which in the example is the single location "010." The location list for a word entry may in fact have multiple locations, instead of the single location of the example. If so, then the search engine performs the nested field search method of the present invention for every location in the location list 206 separately. It does so to present to the user all instances of the specified words that match the specified field search criteria.

The search engine also searches the index to identify locations of a first class of meta words that includes the first start or first end meta word (412). While it generally does not matter which type of meta word is used for the first class of meta words, i.e., the start or end meta word, it must be consistent with the type of meta word used for the second class of meta words. In the example, the first end meta word, ListEnd, will be used. This meta word is also referred to as the bounding meta word. The index is then searched until a generic word entry 216 is located having an object identifier 204 corresponding to ListEnd. In the example provided, the generic word entry having an object identifier corresponding to ListEnd is the seventh database index entry from the top. In this instance, ListEnd represents a class of meta words because it does not have specific nesting level information in the object identifier, i.e., it is not ListEnd0 or ListEnd1. Sometimes, a class of meta words may only contain one meta word because the document itself only contains one meta word at one nesting level. In one embodiment of the present invention, when there is only one nesting level of meta word in the class of meta words, there are not separate meta word and generic meta word entries for that class of meta words.

In the example, the locations for the ListEnd meta words in the class of ListEnd meta words are "1201" and "1300." These locations are not the actual locations, but rather encoded representations of both the location and the nesting level for the ListEnd meta words, in accordance with one implementation of the present invention. The true location can be derived from these values by rounding each down to the nearest hundred (the last two digits of each number contain nesting level information, which is utilized later in the inventive method), and then dividing each by 100 (an illustrative value chosen for this example). Thus, the locations for the ListEnd meta words are 012 and 013.

After identifying the location of the locations of the first class of meta words, the search engine searches the index to identify the locations of a second class of meta words that includes the second start or end meta word (414). In the example, the second end meta word must be used because the first end meta word was used; thus, the second class of meta words is ParEnd. The index is searched until a generic word entry 216 is located having an object identifier 204 corresponding to ParEnd. In the given example, this generic word entry 216 is located at the fourteenth entry from the top of the database index entries. The location list 206 of this generic word entry contains the locations of all occurrences of ParEnd, regardless of the nesting level. Thus, in the given example, the generic meta word entry 216 for ParEnd includes locations for ParEnd at both nesting levels zero and one. The locations in the location list 206 associated with the ParEnd generic meta word entry are 1501 and 1700, but, again, by rounding down to the nearest 100 and then dividing by 100, the actual locations of 015 and 017 can be derived.

Meta words are used in complementary pairs, each having a first meta word and a second meta word, to indicate the boundaries of fields in a document. The search engine uses "first spatial criteria" to determine if the first meta word of a meta word pair satisfy the requirements of a query, and uses "second spatial criteria" to determine if the second meta word of a meta word pair satisfy the requirements of a query. For instance, the first spatial criteria may require a meta word to be located after a particular word or other meta word in a document, while the second spatial criteria may require another meta word to be located earlier in the document than a particular word or meta word, or between the particular word and another meta word. By doing so, the search engine can readily determine whether a meta word pair defining a field encapsulates (i.e., contains) the specified word being searched for, and whether a meta word pair encapsulates a nested field (defined by another meta word pair).

At step 416, the search engine applies first spatial criteria to the identified locations of the first class of meta words and to the identified locations of the specified words. Then, using the results of step 416, the search engine selects a first meta word from the first class of meta words (418). Further detail on these steps for one embodiment of the present invention is provided in FIG. 5A. As part of applying the first spatial criteria, the search engine determines the closest location, out of the identified locations for the first class of meta words, in a particular direction with respect to the identified location of the specified words (502). This closest location is also referred to as the bounding location. In the example, the identified locations for the ListEnd class of meta words are 012 and 013, and the identified location of the word "navy" is 010. Thus, the search engine determines that the 012 location for the ListEnd class of meta words is closest to the 010 location of "navy." Then, the search engine selects a first meta word from the first class of meta words corresponding to this determined closest location (504). The first selected meta word is also be referred to as the bounding meta word at the bounding location. The selection of a first meta word follows automatically from the determination of the closest location, 012 in the example, as this location in this generic meta word entry already represents a ListEnd meta word at 012.

In one embodiment of the present invention, the closest location will be determined by what type of meta words the first class of meta words contains. If the meta words are end meta words, e.g. ParEnd or ListEnd, then the closest location will be the first location after (i.e., greater than) the identified location of the specified words, assuming the database index entries are stored in an increasing collating order. Similarly, if the meta words are beginning meta words, e.g. ParBegin or ListBegin, then the closest location will be the first location before (i.e., less than) the identified location of the specified words (again, assuming the database index entries are stored in an increasing collating order).

Figure 4B:
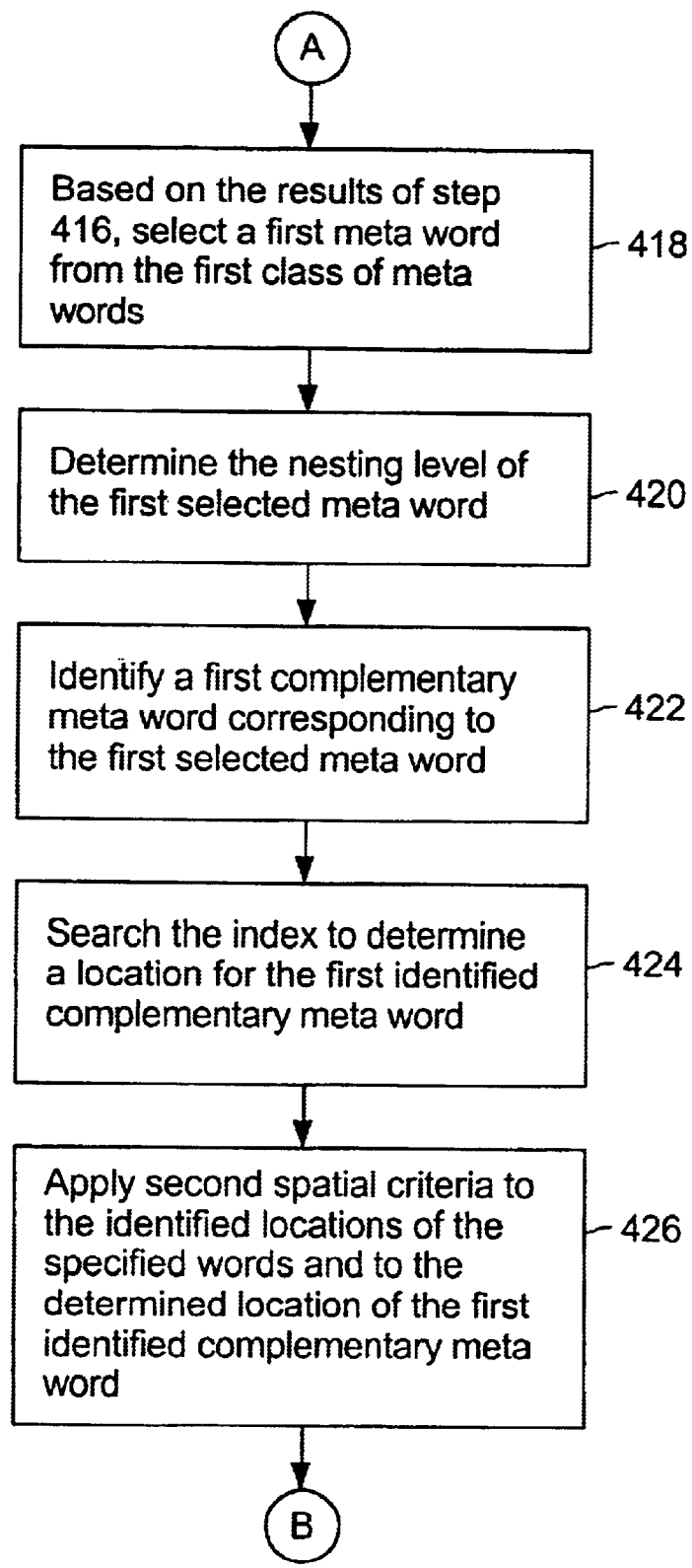

Returning to FIG. 4B, the search engine next determines the nesting levels of the first selected meta word (420). In one embodiment of the present invention, the nesting level information is encoded into the locations in the location list 206 of a generic meta word entry 216. In the example, the nesting level is recorded by the last two digits of each location for a generic meta word entry. This information was previously disregarded when the true locations of each meta word were obtained by rounding the value down to the nearest 100, thereby eliminating the nesting level information, and then dividing by 100. However, the search engine could just have easily ascertained the nesting level of each meta word at the same time the locations of the meta words in the class of meta words were identified. This demonstrates an important tenant of the present invention—in actual implementations some of the steps shown here in sequential order are performed together or in an interleaved manner.

In the example, the nesting level of the first selected meta word, ListEnd at 012, is one. This is true because the original, unmodified location for the ListEnd meta word at location 012 was 1201. The last two digits are 01, representing a nesting level of one. After obtaining this value, the search engine identifies a first complementary meta word corresponding to the first selected meta word (422). A "complementary meta word" is the opposite or complement of the start or end meta word, such that the complementary meta word to a start meta word is an end meta word, and the complementary meta word to an end meta word is a start meta word. Thus, in the example, the search engine identifies ListBegin as the first complementary meta word corresponding to the first selected meta word, ListEnd. In one embodiment of the present invention, the first complementary meta word also corresponds to the determined nesting level of the first selected meta word, which in the example is one. Thus, in this embodiment, the first complementary meta word is ListBegin1.

After this identification, the search engine searches the index to determine a location for the first identified complementary meta word (424). The sixth entry from the top of the database index entries in the example, ListBegin1, specifies a location of 009. In the example, the ListBegin1 meta word entry only has one location, but in other cases, it may have multiple locations in the location list 206. Further detail on the step of searching the index to determine which location out of multiple locations to choose is shown in FIG. 6A for one embodiment of the present invention. If there are multiple locations, the search engine searches the index to determine a closest complementary location of the first identified complementary meta word with respect to the identified location corresponding of the first selected meta word (602), also referred to as "the complementary location." It does so in order to identify a matching pair of meta words—i.e., the pair of meta words, a start meta word and an end meta word, which together define a field.

Figure 4C:
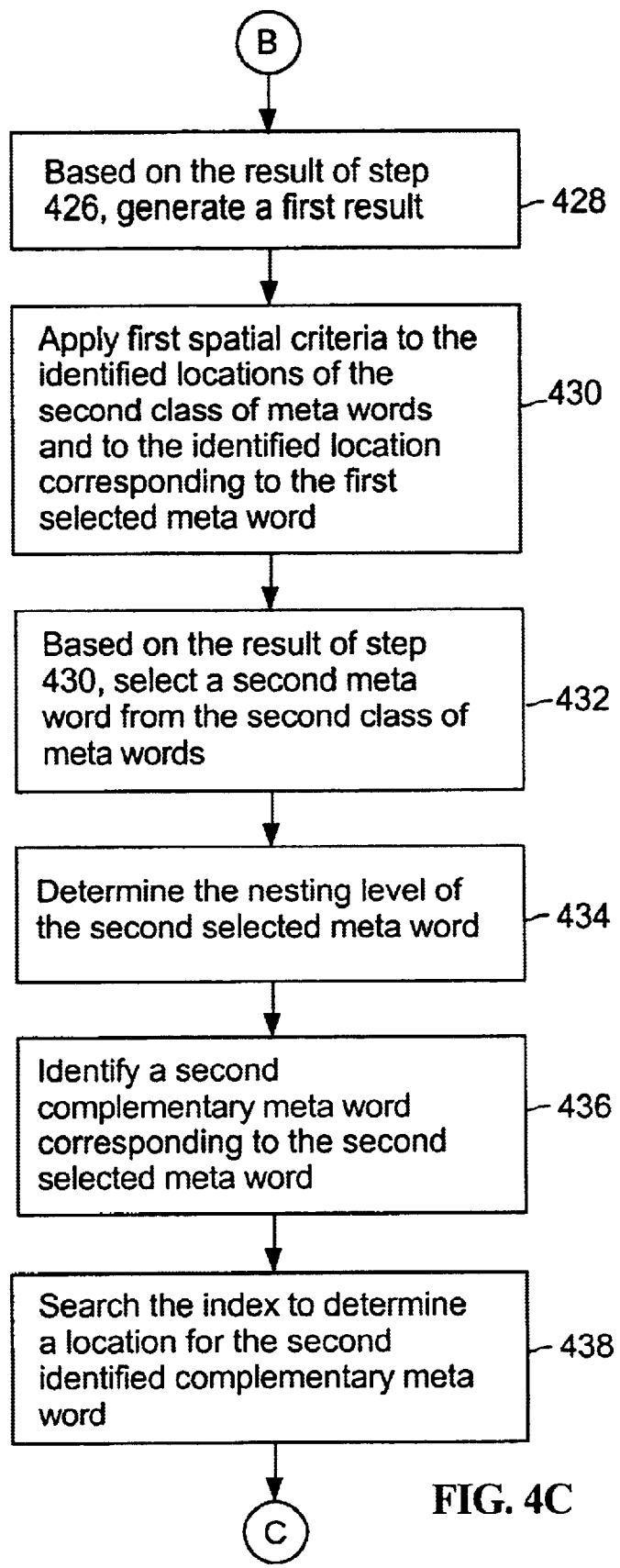

Referring back to FIG. 4B, the search engine next applies second spatial criteria to the identified locations of the specified words and to the determined location of the first identified complementary meta word (426). Further detail on this step in one embodiment of the present invention is provided in FIG. 7A. In this embodiment, as part of applying the second spatial criteria, the search engine determines whether the identified location of the specified words falls between the determined location for the first identified complementary meta word, and the determined location for the closest location of the first class of meta words (702). The determined closest location for the first class of meta words is the same as the identified location corresponding to the first selected meta word. In the example, the identified location of the specified words is 010, the determined location for the first identified complementary meta word is 009, and the determined closest location for the first class of meta words is 012; thus, the determination would be true (010 falls between 009 and 012). Another way to describe this analysis is that a location in the location list of the specified words falls between the bounding location and the complementary location. As shown in FIG. 4C, the search engine would thus generate a first result corresponding to the true state of the determination (428). In this case, the "true" first result would indicate that the specified words are found within a first field associated with the first selected meta word and the first identified complementary meta word, or are found within a first field associated with the bounding meta word and the complementary meta word.

In another embodiment of the present invention, the search engine applies the second spatial criteria to the identified location of the specified words and to the determined location for the first identified complementary meta word. In this case, the search engine determines whether the determined location for the first identified complementary meta word is on the appropriate side of the identified location of the specified words. In other words, if the first identified complementary meta word is a beginning meta word, it should be at a location closer to the beginning of the document than the identified location of the specified words. For this embodiment to operate correctly, the search engine must also apply the first spatial criteria to select a first meta word based on the type of meta word found in the first class of meta words. For example, the search engine would select a first meta word, if it is an end meta word, that is at a location closer to the end of the document than the identified location of the specified words. By doing so, upon applying the second spatial criteria, the mere fact that the first identified complementary meta is on the appropriate side of the selected words will be sufficient to prove that the specified words are found within a field bounded by the first selected meta word and the first identified complementary meta word.

Next, the search engine applies first spatial criteria to the identified locations of the second class of meta words and to the identified location corresponding to the first meta word (430) and, based on this result, selects a second meta word from the second class of meta words (432). Further detail on these steps in one embodiment of the search engine of the present invention is shown in FIG. 5B. The search engine determines the closest location, out of the identified locations for the second class of meta words, to the determined closest location for the first class of meta words (506). In the example, recall that the identified locations for the second class of meta words (ParEnd) were 015 and 017. Thus, the closest location from this set to the determined closest location for the first class of meta words, 012, would be 015. From this value, the search engine selects a second meta word from the second class of meta words corresponding to the determined closest location (508). As with the selection of the first meta word, this selection follows automatically from the determination of the closest location, as this location in this generic meta word entry represents a ParEnd meta word at 015. Also, as discussed previously, in one embodiment the closest location is determined in part by the type of meta words in the second class of meta words.

Referring back to FIG. 4C, the search engine next determines the nesting level of the second selected meta word (434). Using the same methodology as for the first selected meta word, the search engine would determine that the nesting level of the second selected meta word, encoded into the location value—1501—is one (from the last two digits). Then, the search engine determines a second complementary meta word corresponding to the second selected meta word (436). The complementary meta word to a ParEnd meta word is a ParBegin meta word. In a preferred embodiment of the present invention, the second complementary meta word also corresponds to the determined nesting level of the second selected meta word. Thus, in this embodiment, the second complementary meta word is ParBegin1.

After this identification, the search engine searches the index to determine a location for the second identified complementary meta word (436). In the example, the thirteenth entry from the top in the index of database index entries is ParBegin1. It specifies a location of 003. As with the first identified complementary meta word, there could be more than one location identified, in which case the methodology of FIG. 6B can be used in one embodiment of the present invention. Under this procedure, the search engine searches the index to determine a closest complementary location of the second identified complementary word with respect to the identified location corresponding to the second selected meta word (604). It does so in order to match the pair of meta words (start and end) defining a field. Again, the term "complementary location" refers to a location on the appropriate opposite side of the second selected meta word, for example, toward the beginning of the document if the second selected meta word is an end meta word.

Figure 4D:
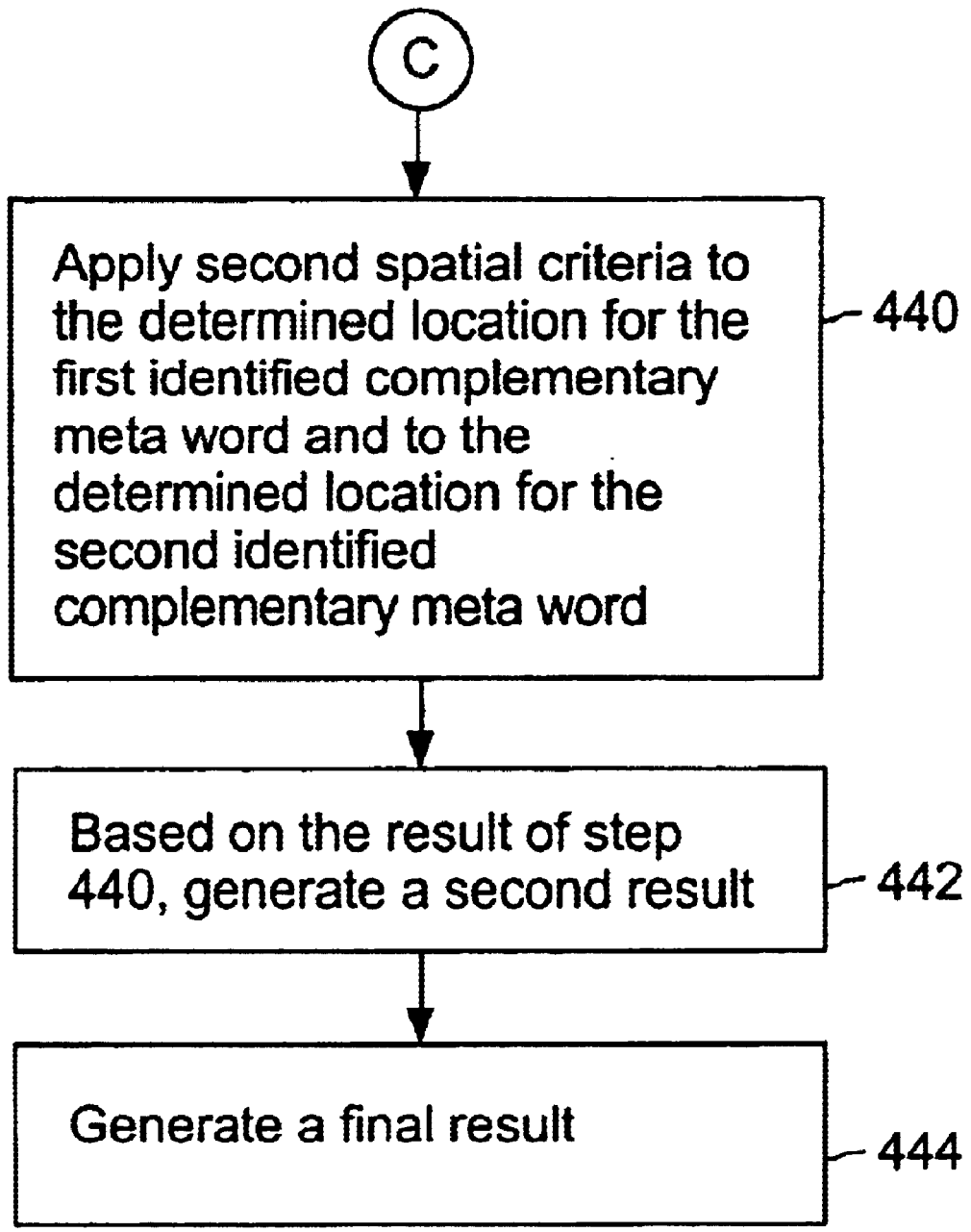

Referring to FIG. 4D, the search engine next applies second spatial criteria to the determined location for the first identified complementary meta word and to the determined location for the second identified complementary meta word (440). Further detail on this step in one embodiment of the present invention is provided in FIG. 7B. As part of applying the second spatial criteria, the search engine determines whether the determined location for the first identified complementary meta words falls between the determined location for the second identified complementary meta word and the identified location of the specified words (704). In the example, the determined location for the first identified complementary meta word is 009, the determined location for the second identified complementary meta word is 003, and the identified location of the specified words is 010. Because 009 falls between 003 and 010, the determination is true. Thus, in FIG. 4D, the search engine would generate a second result indicating the true state of the determination (442). In this case, the "true" second result would indicate that the first field is found within a second field associated with the second selected meta word and the second identified complementary meta word.

In another embodiment of the present invention, the search engine applies second spatial criteria to the determined location for the first identified complementary meta word and to the determined location for the second identified complementary meta word. In this embodiment, the search engine determines whether the determined location for the second identified complementary meta word is on the appropriate side of the determined location for the first identified complementary meta word. In other words, if the second identified complementary meta word is a beginning meta word, it should be at a location closer to the beginning of the document than the determined location for the first identified complementary meta word. For this embodiment to operate correctly, the search engine must also apply the first spatial criteria to select a second meta word based on the type of meta word found in the second class of meta words. For example, the search engine would select a second meta word, if it is an end meta word, that is at a location closer to the end of the document than the identified location of the first selected meta word. By doing so, upon applying the second spatial criteria, the mere fact that the second identified complementary meta is on the appropriate side of the first identified complementary meta word will be sufficient to prove that the first field, bounded by the first selected meta word and the first identified complementary meta word, is within the second field, bounded by the second selected meta word and the second identified complementary meta word.

Finally, based on the true first and second results, the search engine would generate a final result (444). As part of the final result, in one embodiment, the user is notified that the specified words are found within an instance of the first field that is found within an instance of the second field.

Complex Searching

To understand the nuances of more complex searches, assume that a user wishes to find the word "blue" within a list that is within a paragraph, using the same illustrative document and index described above. Utilizing the same inventive method described above, all of the values for the first and second start and end meta words would be the same, because the same fields are specified ("a list that is within a paragraph") in the query. The only difference is that the identified location of the specified words would be different. In this new example, the location for the word entry for "blue" is 008, as identified in the first database index entry from the top. Thus, in one embodiment, after the search engine applies the second spatial criteria to determine whether the identified location of the specified words falls between the determined location for the first identified complementary meta word, and the determined location for the closest location of the first class of meta words, it would generate a false for the first result. This is because 008 does not fall between 009 (the determined location for the first identified complementary meta word) and 012 (the determined location for the closest location of the first class of meta words).

Equivalently, the search engine applies the second spatial criteria to the identified location of the specified words and to the determined location for the first identified complementary meta word. By doing so, the search engine determines whether the determined location for the first complementary meta word, 009, is on the appropriate side of the identified location of the specified words, 008. The appropriate side is determined by the fact that the first complementary meta word is a start meta word, ListBegin. Therefore, the determined location for the first complementary meta word should be closer to the beginning of the document than the specified words. Because this is not true in the example, the search engine assigns a false to the first result in this embodiment as well.

The search engine can conduct the analysis for the second field to determine whether it encloses the first field, but in one embodiment, the search engine simply generates a result indicating that the specified words are not found within a first field associated with the first selected meta word and the first identified complementary meta word. Thus, in the example, the search engine has determined that the specified words do not fall within the first list field. But, the word being searched—"blue"—does fall within a list, but the enclosing list happens not to be the first list field identified by searching the index. This result demonstrates a circumstance that occurs when searching for words found immediately before a nested field. Because the search engine first looks for the closest location of an end meta word, if there are no intervening end meta words, the search engine will locate the nested end meta word and the nested complementary start meta word, which are both on the same side of the document relative to the specified words. The search engine then correctly determines that the specified words are not within the nested field.

In many cases such as the example, however, the determination that the specified words are not found within the first field is not the final result. Rather, the search engine must recurse through multiple nesting levels for the first and second classes of meta words until it can generate a final result that either: (1) the specified words are found within an instance of the first specified field that is found within an instance of the second specified field; or (2) there is no instance of the specified words within an instance of the first specified field that is within an instance of the second specified field. The following pseudo-code demonstrates one way the search engine reaches such a final determination in one embodiment of the present invention:

```
01  Pseudo-code for Compiled Exemplary Query
02  / LastLevel = number of nested fields in the query /
03  level = 1
04  Nest() {
05      LocList = select subset of locations of the generic meta word, at the current level,
            meeting first spatial criteria;
06      result = 0;
07      ItemEnd = 0
08      Do Until ((result = success) or (ItemEnd = last item in LocList)) {
09          ItemEnd = next item in LocList;
10          determine nesting level of ItemEnd;
11          ItemBegin = the complementary meta word;
12          If ItemBegin meets second spatial criteria {result = success};
13          If (result=success) and (level NotEqual LastLevel) {
14              Increment level;
15              LastItemEnd = ItemEnd;
16              LastitemBegin = ItemBegin
17              Nest (); / recursive call to Nest to handle the next outmost field
18              }
19          }/ end of the Do loop /
20      If result NotEqual success {
21          Output "failure message";
22          Report "level, result, ItemBegin, ItemEnd, ..."; / Exit Nest() program /
23          }
24      Report "level, result, ItemBegin, ItemEnd, ..."
25      } / end of Nest() procedure
26  / report success /
27  Output a final result based on results reported by Nest() procedure for each level;
28  / end of program /
```

The pseudocode used to represent the operation of the search engine is, essentially, a computer language using universal computer language conventions. While the pseudocode employed here has been invented solely for the purposes of this description, it is designed to be easily understandable by any computer programmer skilled in the art.

The operation of the pseudo-code for the search engine will now be described in detail. The search engine operates the same way as described previously up to the application of the first spatial criteria. At this point, as reflected in the comment of line 02, the search engine determines the total number of nested fields (i.e., nesting levels of fields) in the query. In the example—the search for "blue" within a list that is found within a paragraph—the total number of nested fields in the query is two: a list (one) within a paragraph (two). The variable LastLevel is assigned this value. At line 03, the variable "level" (i.e., the current nested field of the query being searched) is set to one. This corresponds to the first specified field—the list.

At line 04, the search engine begins the subroutine Nest ( ) which determines whether a specific field, corresponding to the current "level" of the nested fields in the query currently being searched, encompasses a particular location(s). The location desired to be encompassed may be the location of the specified words or the locations of a field nested within the field being searched. Next, at line 05, the search engine assigns a select subset of locations of the generic meta word, at the current level, meeting first spatial criteria to the variable LocList. Because the current value of the variable "level" is one, the generic meta word at the current level is a List meta word. Note that in this sense, level does not mean nesting level, but rather the level of nested fields in the query that are being sequentially searched. For the example, either the ListBegin or ListEnd meta word can be used for determining LocList, but the first and second spatial criteria must be applied oppositely depending on which type of meta word is chosen.

For purposes of illustration, assume that LocList is determined from the ListEnd generic meta word. To identify the select subset of locations of the ListEnd generic meta word that meet the first spatial criteria, the search engine compares the identified location of the specified words and the identified locations of the generic meta word at the current level. Then, it chooses all of the locations of the ListEnd generic meta word that are greater (closer to the end of the document) than the location of the specified words. In the example, the identified location of the specified words is 008, and the locations of the ListEnd generic meta word are 12 and 13. In this case, all of the locations of the ListEnd generic meta word are greater than the location of the specified words, and thus LocList is assigned both values—12 and 13.

While, for the case of level=1, the first spatial criteria compares the identified location of the specified words and the identified locations of the generic meta word at the current level, at higher levels the comparison is different, as explained in further detail below.

Next, at lines 06 and 07, the variables "result" and "ItemEnd" are initialized to zero. At line 08, the search engine enters a do loop. The loop is repeated until either the variable "result" is equal to success, or until the variable ItemEnd is equal to the last item in LocList. At line 09, the variable ItemEnd is set to the next item in LocList. Because ItemEnd is originally initialized to zero, the first time ItemEnd is set to the next item, it points to the first location in LocList—012 in the example, and hence the ListEnd meta word at 012. At line 10, the search engine determines the nesting level of ItemEnd. As described above, in one embodiment of the present invention, the nesting level is encoded into the last two digits of each location in a generic meta word entry. In the example, the actual values stored in the location list 206 for the generic meta word ListEnd are 1201 and 1300, corresponding to nesting levels of one and zero, respectively. Thus, in the first pass of the do loop in the example, ItemEnd is the ListEnd meta word at 012, and the nesting level of ItemEnd is one, based on the encoded location 1201.

At line 11, the variable ItemBegin is set to the complementary meta word of ItemEnd. The complementary meta word to ItemEnd is the closest complementary location of the matching meta word to ItemBegin, at the same nesting level. For example, for the first pass of the do loop in the example, ItemBegin would be the closest occurrence of ListBegin1 to ListEnd at 012, toward the direction of the beginning of the document (i.e., the "complementary location"). In the example, there is only one location in the location list 206 of the ListBegin1 meta word entry. The value of that location is 009, so ItemBegin is set to the ListBegin meta word at 009.

Next, at line 12 of the pseudo-code, the search engine sets the variable "result" equal to success if ItemBegin meets the second spatial criteria. The second spatial criteria, in the case of level=1, involves a comparison of the location of ItemBegin to determine whether it is on the appropriate side of the identified location of the specified words. If the ItemBegin is a start meta word, like ListBegin of the example, its location should be less (closer to the beginning of the document) than that of the specified words. In the example, the location of ItemBegin is 009, but the location of the specified word, blue, is 008. Thus, the second spatial criteria is not met and thus, under the instruction of line 12, "result" is unaffected. Because the if clause on line 13 applies only if the result is equal to "success", the code at lines 13 thru 18 is skipped and the Do loop repeats again in accordance with the looping instruction at lines 08 and the end of loop at line 19.

In the next pass of the do loop, ItemEnd is set to the next item in LocList, or the ListEnd meta word at 013. The nesting level of ListEnd at 013 is zero because the actual encoded location Wis 1300 has the last two digits 00. The complementary meta word is thus ListBegin0, and the closest complementary occurrence is, in the case of the example, the only location in the location for this particular meta word entry—the location 005. Thus, ItemBegin is the ListBegin meta word at 005. This time, the second spatial criteria is satisfied, because the location of ItemBegin is on the appropriate side of the identified location of the specified words—005 is less than 008. Therefore, the variable "result" is set to success (at line 12).

If "result" is equal to success, which in the example means that the specified words have been found with a first field bounded by the meta words of ItemBegin and ItemEnd, the search engine next determines if "level" is equal to the LastLevel, at line 13. If so, all nested fields in the query have been searched. In the example, LastLevel is equal to two, and the current "level" is set to one. Because level is not equal to LastLevel in accordance with the instruction at line 18, the search engine increments "level" to two at line 14, stores the current value of ItemEnd (ListEnd at 012) in LastItemEnd at line 15, and stores the current value of ItemBegin (ListBegin at 005) in LastItemBegin at line 16. Then, the search engine recursively calls the Nest ( )

subroutine again at line 17. The increase in "level," together with the recursive call to Nest ( ), effectively causes the search engine to recurse through all nested fields in a query, from the innermost nested field to the outermost field.

On the first recursive call to Nest ( ), LocList is determined from a generic meta word corresponding to the second field, or in the example, ParEnd. Next, the search engine must apply the first spatial criteria to ParEnd to identify the select subset of locations of the ParEnd generic meta word that comprise LocList. However, the first spatial criteria that is applied is different than the first spatial criteria that was applied when level=1. Here, for the first spatial criteria, the search engine compares the identified locations of the generic meta word at the current level, and the location of ItemEnd from the last execution of the do loop in the Nest ( ) subroutine, stored in the LastItemEnd variable. For the example, LastItemEnd was a ListEnd meta word at 012. Thus, the locations of the ParEnd generic meta word are compared to this location, and LocList is set to be equal to all of the locations of the ParEnd generic meta word that are greater than 012. The locations of ParEnd are 015 and 017; thus LocList comprises 015 and 017, since both of these values are greater than 012.

Next, after initializing "result" and "ItemEnd" to zero, the do loop is executed. ItemEnd is set to the first item in LocList, or ParEnd at 015. The nesting level of ParEnd at 015 is one, because the actual encoded value for ParEnd at this location is 1501, with the last two digits representing the nesting level. Then, the search engine sets ItemBegin to the complementary meta word to ItemEnd. The complementary meta word to ParEnd at nesting level one is ParBegin1. According to the ParBegin1 meta word entry, the complementary location for ParBegin1 is 003. Although there is only one location for the ParBegin1 meta word in the example, in other examples there may be more than one location, and the closest complementary location will be the closest location to the location of ItemBegin that constitutes a matching meta word pair defining a field.

Next, the search engine applies second spatial criteria to ItemBegin. Like with the first spatial criteria, the second spatial criteria is different when level is greater than 1, than for when level=1. When level is greater than 1, as in the present example, the second spatial criteria involves a comparison of the location of ItemBegin to determine whether it is on the appropriate side of the location of the value of ItemBegin from the last recursive call, stored in LastItemBegin. Because ItemBegin is a start meta word, its location should be less than the location of LastItemBegin to satisfy the second spatial criteria. The location of ItemBegin is 003 and the location of LastItemBegin is 005. Thus, because 003 is less than 005, the second spatial criteria is satisfied, and "result" is set to=success (at line 12). In other words, by applying the second spatial criteria to Item Begin (relative to LastItemBegin), the search engine determines that a second field (defined by the current ItemBegin and ItemEnd meta word pair) encapsulates the first field (defined by LastItemBegin and LastItemEnd).

At line 13, the search engine determines that "result" is equal to "success" and that "level," which is LastLevel (both are equal to two), indicating that all of the specified fields in the query have been searched and that a matching text and field pattern has been found in a document in the database. As a result, lines 14 to 19 are skipped. Lines 20 to 23 are also skipped, because result is equal to "success."

At line 24, the level, result, and start and end meta words for the encompassing field (ItemBegin and ItemEnd) are reported out. At line 25, the Nest ( ) subroutine ends, causing the recursion to "unwind," such that "result" and ItemBegin and ItemEnd are reported for each level. At lines 26 and 27, if the search engine reports back success for all levels, the search engine can output a final result indicating that the query conditions have been met which, in the example, would be that the specified words are found within an instance of the first field that is found within an instance of the second field. Or, more specifically, the search engine would report that the word "blue" is found within a list that is found within a paragraph in the document. Also, it would report some of the locations of the ItemBegin and ItemEnd values for each level, indicating where in the documents the encompassing fields were found. At line 28, the pseudo-code program ends.

After the do loop (which starts at line 08) is exited, at line 20 the search engine determines whether "result" is not equal to success. This is important because one of the conditions under which the do loop can be exited in accordance with the instruction at line 08 is that ItemEnd is equal to the last item in LocList. If this occurs, and "result" has not been set to success, none of the fields corresponding to the locations in LocList, at any of the nesting levels, encompass the desired feature, whether it is the specified words or a nested field. At this point, the recursion through all of the levels of the nested fields in the query can be stopped because the final result is that no instance of the specified words are found within the specified fields of the query. Thus, a failure message is generated, as indicated at line 21, and the Nest procedure is exited at line 22 with an appropriate return code or message. The Nest procedure's failure return code will propagate up to the next earlier invocation of the Nest ( ) procedure, if any. If the current Nest procedure was the first one to be called, for level=1, then a final result output is generated at line 27.

The present invention can be implemented as a computer program product that includes a computer program mechanism embedded in a computer readable storage medium. For instance, the computer program product could contain the search engine and indexer program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer-implemented method of indexing a database of documents, a subset of the documents containing nested fields, each nested field having an associated start meta word and end meta word, each meta word having an associated nesting level, the method comprising:

indexing each document containing nested fields by:
   parsing the document to determine locations within the document of words and meta words in the document and to determine the nesting level associated with each meta word; and generating an index including
> word entries, each word entry identifying locations within the document of an identified word;
>
> meta word entries, each meta word entry identifying locations within the document of an identified meta word and indicating the determined nesting level associated with the meta word; and
>
> generic meta word entries, each generic meta word entry identifying locations within the document of a class of meta words, including meta words at all nesting levels of the meta words found in the document, the generic meta word entry including, for each identified location within the generic meta word entry, information identifying the nesting level associated with the meta word at the identified location.

2. The computer-implemented method of claim 1, wherein each word entry, meta word entry, and generic meta word entry includes an object identifier and a location list.

3. The computer-implemented method of claim 1, wherein each word entry, the object identifier includes one or more words, and the location list includes locations of the one or more words in the document.

4. The computer-implemented method of claim 1, wherein for each meta word entry, the object identifier includes a meta word and an indication of the nesting level associated with the meta word, and the location list includes locations of the meta word in the document.

5. The computer-implemented method of claim 1, wherein, for each generic meta word entry, the object identifier includes a class of meta words, including meta words at all nesting levels of the meta words found in the document, and the location list includes locations of each occurrence of each meta word in the class of meta words in the document, and further includes an indication of the nesting level associated with each occurrence of each meta word in the class of meta words at each location.

6. The computer-implemented method of claim 5, wherein, for the location list for each generic meta word entry, each location of each occurrence of each meta word in the class of meta words in the document is mathematically combined with the nesting level associated with that occurrence of that meta word at that location to encode both the location and the nesting level into a single value.

7. A computer-implemented method of searching a database of documents, a subset of the documents containing nested fields, each nested field having an associated start meta word and end meta word, each meta word having an associated nesting level, the method comprising:
> receiving a query that specifies one or more words to be found within a specified field within a document;
>
> determining a start meta word and end meta word associated with the specified field;
>
> searching an index to identify locations of the specified words and locations of a class of meta words that includes at least one of the start meta word and end meta word associated with the specified field;
>
> applying first spatial criteria to the identified locations of the class of meta words with respect to the identified locations of the specified words to select a meta word from the class of meta words;
>
> determining the nesting level of the selected meta word;
>
> identifying a complementary meta word corresponding to the selected meta word;
>
> searching the index to determine a location for the identified complementary meta word; and
>
> applying second spatial criteria to the identified locations of the specified words and to the determined location for the identified complementary meta word to generate a result that indicates whether the specified words are found within a first field associated with the selected meta word and the identified complementary meta word.

8. The computer-implemented method of claim 7, wherein the first field is the specified field.

9. The computer-implemented method of claim 7, wherein at least a plurality of the steps of applying first spatial criteria, determining the nesting level, identifying a complementary meta word, searching the index, and applying second spatial criteria are repeated until a final a result is generated.

10. The computer-implemented method of claim 9, wherein the final result is selected from the set consisting of (A) the specified words are found within the specified field, and (B) there is no instance of the specified words within the specified field.

11. The computer-implemented method of claim 7, wherein the step of identifying comprises identifying a complementary meta word corresponding to the selected meta word and to its determined nesting level.

12. The computer-implemented method of claim 7, wherein the class of meta words includes a specific meta word at all nesting levels of the specific meta word found in the database.

13. The computer-implemented method of claim 7, wherein the step of applying first spatial criteria comprises the steps of:
> determining a closest location of the identified locations of the class of meta words with respect to an identified location of the specified words, and
>
> selecting the meta word from the class of meta words corresponding to the determined closest location.

14. The computer-implemented method of claim 13, wherein the step of applying second spatial criteria comprises determining whether the identified location of the specified words falls between the determined location for the identified complementary meta word and the determined closest location of the identified locations of the class of meta words to generate a result that indicates whether the specified words are found within the specified field.

15. The computer-implemented method of claim 7, wherein the class of meta words further includes an object identifier and a location list, the object identifier including at least one of the start meta word and end meta word, and the location list including a location, and nesting level information at that location, for each occurrence of the at least one of the start meta word and end meta word.

16. A computer-implemented method of searching a database of documents, a subset of the documents containing nested fields, each nested field having an associated start meta word and end meta word, each meta word having an associated nesting level, the method comprising:
> receiving a query that specifies one or more words to be found within a first specified field that is found within a second specified field within a document;
>
> determining a first start meta word and first end meta word associated with the first specified field, and a second start meta word and second end meta word associated with the second specified field;
>
> searching an index to identify:
> > locations of the specified words,
> >
> > locations of a first class of meta words that includes at least one of the first start meta word and first end meta word associated with the first specified field, and locations of a second class of meta words that includes at least one of the second start meta word and second end meta word associated with the second specified field;

applying first spatial criteria, determined at least in part from the received query, to the identified locations of the first and second classes of meta words and the identified locations of the specified words to select a first meta word from the first class of meta words, and a second meta word from the second class of meta words;

determining the nesting levels of the first and second selected meta words;

identifying a first and second complementary meta words, corresponding to the first and second selected meta words;

searching the index to determine a location for the first identified complementary meta word and a location for the second identified complementary meta word; and applying second spatial criteria, determined from the received query, to the identified locations of the specified words and to the determined locations for the first and second identified complementary meta words to generate a result that indicates whether the specified words are found within a first field, associated with the first selected meta word and the first identified complementary meta word, that is found within a second field, associated with the second selected meta word and the second identified complementary meta word.

17. The computer-implemented method of claim 16, wherein the first field is the first specified field and the second field is the second specified field.

18. The computer-implemented method of claim 16, wherein at least a plurality of the steps of applying first spatial criteria, determining nesting levels, identifying first and second complementary meta words, searching the index, and applying second spatial criteria are repeated until a final a result is generated.

19. The computer-implemented method of claim 18, wherein the final result is selected from the set consisting of (A) the specified words are found within an instance of the first specified field that is found within an instance of the second specified field, and (B) there is no instance of the specified words within an instance of the first specified field that is within an instance of the second specified field.

20. The computer-implemented method of claim 16, wherein the steps of applying first spatial criteria, determining nesting levels, identifying first and second complementary meta words, searching the index and applying second spatial criteria include:

applying the first spatial criteria to the identified locations of the first class of meta words and to the identified locations of the specified words to select a first me a word from the first class of meta words;

determining the nesting level of the first selected meta word;

identifying a first complementary meta word, corresponding to the first selected meta word;

searching the index to determine a location for the first identified complementary meta word;

applying the second spatial criteria to the identified locations of the specified words and to the determined location for the first identified complementary meta word to generate a first result;

applying the first spatial criteria to the identified locations of the second class of meta words and to the identified location corresponding to the first selected meta word to select a second meta word from the second class of meta words;

determining the nesting level of the second selected meta word;

identifying a second complementary meta word, corresponding to the second selected meta word;

searching the index to determine a location for the second identified complementary meta word; and applying the second spatial criteria to the determined location for the first identified complementary meta word and to the determined location for the second identified complementary meta word to generate a second result.

21. The computer-implemented method of claim 20, wherein at least a plurality of the steps of applying first spatial criteria to the identified locations of the first class of meta words, determining the nesting level of the first selected meta word, identifying the first complementary meta word, searching the index to determine a location for the first identified complementary meta word, and applying second spatial criteria to generate a first result are repeated until the first result is a first final result.

22. The computer-implemented method of claim 21, wherein the first final result is selected from the set consisting of (A) the specified words are found within an instance of the first specified field, and (B) there is no instance of the specified words within an instance of the first specified field.

23. The computer-implemented method of claim 16, wherein the step of identifying comprises identifying a first and second complementary meta words corresponding to the first and second selected meta words, and to the determined nesting levels of the first and second selected meta words.

24. The computer-implemented method of claim 16, wherein the first and second classes of meta words include a specific meta word at all nesting levels of the specific meta word found in the database.

25. The computer-implemented method of claim 16, wherein the step of applying first spatial criteria comprises the steps of:

determining a closest location of the identified locations of the first class of meta words with respect to an identified location of the specified words, selecting a first meta word from the first class of meta words corresponding to the determined closest location of the first class of meta words, determining a closest location of the identified locations of the second class of meta words with respect to the first closest location of the identified locations of the first class of meta words, and selecting a second meta word from the second class of meta words corresponding to the determined closest location of the second class of meta words.

26. The computer-implemented method of claim 25, wherein the step of applying second spatial criteria comprises the steps of:

determining whether the identified location of the specified words falls between the determined location for the first identified complementary meta word and the determined closest location of the first class of meta words, determining whether the determined location for the first identified complementary meta word falls between the determined location for the second identified complementary meta word and the identified location of the specified words, and generating a result, based on the determining steps of applying second spatial criteria, that indicates whether that the specified words are found within an instance of the first specified field that is found within an instance of the second specified field.

27. The computer-implemented method of claim 16, wherein the first class of meta words further includes an object identifier and a location list, the object identifier including at least one of the first start meta word and first end meta word, and the location list including a location, and nesting level information at that location, for each occurrence of the at least one of the first start meta word and first end meta word.

28. The computer-implemented method of claim 16, wherein the first class of meta words and the second class of meta words constitute the same class of meta words.

29. A computer-implemented method for searching an index of a database of documents, the index having entries, each entry including an object identifier and a location list, each object identifier including at least one of a word and a meta word, each location list including one or more locations of the at least one of a word and a meta word of each corresponding object identifier, each entry associated with a meta word also including nesting level information for the meta word, the computer-implemented method comprising:

receiving a query that specifies one or more words to be found within a specified field within a document;

determining a start meta word and end meta word associated with the specified field;

identifying a bounding meta word by selecting one of the start meta word and end meta word;

searching the index to identify a first entry that has an object identifier associated with the specified words;

searching the index to identify a second entry that has an object identifier associated with the bounding meta word;

determining a bounding location from a closest occurrence of the bounding meta word with respect to the specified words, by comparing the location list of the second entry and the location list of the first entry;

identifying nesting level information for the bounding meta word at the bounding location;

identifying a complementary meta word to the bounding meta word having corresponding nesting level information as the identified nesting level information for the bounding meta word;

searching the index to locate a third entry that has an object identifier associated with the complementary meta word;

determining a complementary location from the location list of the third entry; and generating a result that indicates whether the specified words are within a first field, associated with the bounding meta word and the complementary meta word, by determining whether a location in the location list of the first entry falls between the bounding location and the complementary location.

30. The computer-implemented method of claim 29, wherein the complementary location of the complementary meta word is opposite to the bounding location of the bounding meta word, relative to the specified words, in the index of the database of documents.

31. The computer-implemented method of claim 29, wherein the first field is the specified field.

32. The computer-implemented method of claim 29, wherein the step of determining a bounding location comprises determining a bounding location of the bounding meta word by applying first spatial criteria to the location list of the second entry and the location list of the first entry, and further wherein the computer-implemented method includes repeating at least a plurality of the steps of determining a bounding location, identifying nesting level information, identifying a complementary meta word, searching the index, determining a complementary location, and generating a result until a final a result is generated.

33. The computer-implemented method of claim 32, wherein the final result is selected from the set consisting of (A) the specified words are found within the specified field, and (B) there is no instance of the specified words within the specified field.

34. A computer program product for use in conjunction with a computer system, the computer system for indexing a database of documents, a subset of the documents containing nested fields, each nested field having an associated start meta word and end meta word, each meta word having an associated nesting level, the computer program product comprising a computer readable storage medium and a computer program mechanism embedded therein, the computer program mechanism comprising:

an indexer for indexing each document containing nested fields by configuring the computer to:

parse the document to determine locations within the document of words and meta words in the document and to determine the nesting level associated with each meta word; and generate an index including word entries, each word entry identifying locations within the document of an identified word;

meta word entries, each meta word entry identifying locations within the document of an identified meta word and indicating the determined nesting level associated with the meta word; and generic meta word entries, each generic meta word entry identifying locations within the document of a class of meta words, including meta words at all nesting levels of the meta words found in the document, the generic meta word entry including, for each identified location within the generic meta word entry, information identifying the nesting level associated with the meta word at the identified location.

35. The computer program product of claim 34, wherein each word entry, meta word entry, and generic meta word entry includes an object identifier and a location list.

36. The computer program product of claim 34, wherein, for each meta word entry, the object identifier includes a meta word and an indication of the nesting level associated with the meta word, and the location list includes locations of the meta word in the document.

37. The computer program product of claim 34, wherein, for each generic meta word entry, the object identifier includes a class of meta words, including meta words at all nesting levels of the meta words found in the document, and the location list includes locations of each occurrence of each meta word in the class of meta words in the document, and further includes an indication of the nesting level associated with each occurrence of each meta word in the class of meta words at each location.

38. The computer program product of claim 37, wherein, for the location list for each generic meta word entry, each location of each occurrence of each meta word in the class of meta words in the document is mathematically combined with the nesting level associated with that occurrence of that meta word at that location to encode both the location and the nesting level into a single value.

39. A computer program product for use in conjunction with a computer system, the computer system for searching a database of documents, a subset of the documents containing nested fields, each nested field having an associated start meta word and end meta word, each meta word having an associated nesting level, the computer program product comprising a computer readable storage medium and a computer program mechanism embedded therein, the computer program mechanism comprising:

instructions for receiving a query that specifies one or more words to be found within a specified field within a document;

instructions for determining a start meta word and end meta word associated with the specified field;

instructions for searching an index to identify locations of the specified words and locations of a class of meta words that includes at least one of the start meta word and end meta word associated with the specified field;

instructions for applying first spatial criteria to the identified locations of the class of meta words with respect to the identified locations of the specified words to select a meta word from the class of meta words;

instructions for determining the nesting level of the selected meta word;

instructions for identifying a complementary meta word corresponding to the selected meta word;

instructions for searching the index to determine a location for the identified complementary meta word; and instructions for applying second spatial criteria to the identified locations of the specified words and to the determined location for the identified complementary meta word to generate a result that indicates whether the specified words are found within a first field associated with the selected meta word and the identified complementary meta word.

40. The computer program product of claim 39, wherein the first field is the specified field.

41. The computer program product of claim 39, wherein at least a plurality of the instructions for applying first spatial criteria, determining the nesting level, identifying a complementary meta word, searching the index, and applying second spatial criteria are repeated until a final a result is generated.

42. The computer program product of claim 41, wherein the final result is selected from the set consisting of (A) the specified words are found within the specified field, and (B) there is no instance of the specified words within the specified field.

43. The computer program product of claim 39, wherein the instructions for identifying comprise instructions for identifying a complementary meta word corresponding to the selected meta word and to its determined nesting level.

44. The computer program product of claim 39, wherein the class of meta words includes a specific meta word at all nesting levels of the specific meta word found in the database.

45. The computer program product of claim 39, wherein the instructions for applying first spatial criteria comprise:

instructions for determining a closest location of the identified locations of the class of meta words with respect to an identified location of the specified words, and instructions for selecting the meta word from the class of meta words corresponding to the determined closest location.

46. The computer program product of claim 45, wherein the instructions for applying second spatial criteria comprise instructions for determining whether the identified location of the specified words falls between the determined location for the identified complementary meta word and the determined closest location of the identified locations of the class of meta words to generate a result that indicates whether the specified words are found within the specified field.

47. The computer program product of claim 39, wherein the class of meta words further includes an object identifier and a location list, the object identifier including at least one of the start meta word and end meta word, and the location list including a location, and nesting level information at that location, for each occurrence of the at least one of the start meta word and end meta word.

48. A computer program product for use in conjunction with a computer system, the computer system for searching a database of documents, a subset of the documents containing nested fields, each nested field having an associated start meta word and end meta word, each meta word having an associated nesting level, the computer program product comprising a computer readable storage medium and a computer program mechanism embedded therein, the computer program mechanism comprising:

instructions for receiving a query that specifies one or more words to be found within a first specified field that is found within a second specified field within a document;

instructions for determining a first start meta word and first end meta word associated with the first specified field, and a second start meta word and second end meta word associated with the second specified field;

instructions for searching an index to identify:

locations of the specified words, locations of a first class of meta words that includes at least one of the first start meta word and first end meta word associated with the first specified field, and locations of a second class of meta words that includes at least one of the second start meta word and second end meta word associated with the second specified field;

instructions for applying first spatial criteria, determined at least in part from the received query, to the identified locations of the first and second classes of meta words and the identified locations of the specified words to select a first meta word from the first class of meta words, a second meta word from the second class of meta words;

instructions for determining the nesting levels of the first and second selected meta words;

instructions for identifying a first and second complementary meta words, corresponding to the first and second selected meta words, and searching the index to determine a location for the first identified complementary meta word and a location for the second identified complementary meta word; and instructions for applying second spatial criteria, determined from the received query, to the identified locations of the specified words and to the determined locations for the first and second identified complementary meta words to generate a result that indicates whether the specified words are found within a first field, associated with the first selected meta word and the first identified complementary meta word, that is found within a second field, associated with the second selected meta word and the second identified complementary meta word.

49. The computer program product of claim 48, wherein the first field is the first specified field and the second field is the second specified field.

50. The computer program product of claim 48, wherein at least a plurality of the instructions for applying first spatial criteria, determining nesting levels, identifying first and second complementary meta words, searching the index, and applying second spatial criteria are repeated until a final a result is generated.

51. The computer program product of claim 50, wherein the final result is selected from the set consisting of (A) the specified words are found within an instance of the first specified field that is found within an instance of the second specified field, and (B) there is no instance of the specified words within an instance of the first specified field that is within an instance of the second specified field.

52. The computer program product of claim 51, wherein the instructions for applying second spatial criteria comprise:
  instructions for determining whether the identified location of the specified words falls between the determined location for the first identified complementary meta word and the determined closest location of the first class of meta words,
  instructions for determining whether the determined location for the first identified complementary meta word falls between the determined location for the second identified complementary meta word and the identified location of the specified words, and
  instructions for generating a result that indicates whether that the specified words are found within an instance of the first specified field that is found within an instance of the second specified field if both determinations are true.

53. The computer program product of claim 48, wherein the instructions for applying first spatial criteria, determining nesting levels, identifying first and second complementary meta words, searching the index and applying second spatial criteria include:
  instructions for applying the first spatial criteria to the identified locations of the first class of meta words and to the identified locations of the specified words to select a first meta word from the first class of meta words;
  instructions for determining the nesting level of the first selected meta word;
  instructions for identifying a first complementary meta word, corresponding to the first selected meta word;
  instructions for searching the index to determine a location for the first identified complementary meta word;
  instructions for applying the second spatial criteria to the identified locations of the specified words and to the determined location for the first identified complementary meta word to generate a first result;
  instructions for applying the first spatial criteria to the identified locations of the second class of meta words and to the identified location corresponding to the first selected meta word to select a second meta word from the second class of meta words;
  instructions for determining the nesting level of the second selected meta word;
  instructions for identifying a second complementary meta word, corresponding to the second selected meta word;
  instructions for searching the index to determine a location for the second identified complementary meta word; and
  instructions for applying the second spatial criteria to the determined location for the first identified complementary meta word and to the determined location for the second identified complementary meta word to generate a second result.

54. The computer program product of claim 53, wherein at least a plurality of the instructions for applying first spatial criteria to the identified locations of the first class of meta words, determining the nesting level of the first selected meta word, identifying the first complementary meta word, searching the index to determine a location for the first identified complementary meta word, and applying second spatial criteria to generate a first result are repeated until the first result is a first final result.

55. The computer program product of claim 54, wherein the first final result is selected from the set consisting of (A) the specified words are found within an instance of the first specified field, and (B) there is no instance of the specified words within an instance of the first specified field.

56. The computer program product of claim 48, wherein the first and second classes of meta words include a specific meta word at all nesting levels of the specific meta word found in the database.

57. The computer program product of claim 48, wherein the instructions for applying first spatial criteria comprise:
  instructions for determining a closest location of the identified locations of the first class of meta words with respect to an identified location of the specified words,
  instructions for selecting a first meta word from the first class of meta words corresponding to the determined closest location of the first class of meta words,
  instructions for determining a closest location of the identified locations of the second class of meta words with respect to the first closest location of the identified locations of the first class of meta words, and
  instructions for selecting a second meta word from the second class of meta words corresponding to the determined closest location of the second class of meta words.

58. The computer program product of claim 48, wherein the first class of meta words further includes an object identifier and a location list, the object identifier including at least one of the first start meta word and first end meta word, and the location list including a location, and nesting level information at that location, for each occurrence of the at least one of the first start meta word and first end meta word.

59. The computer program product of claim 48, wherein the instructions for identifying comprise instructions for identifying a first and second complementary meta words corresponding to the first and second selected meta words, and to the determined nesting levels of the first and second selected meta words.

60. The computer program product of claim 48, wherein the first class of meta words and the second class of meta words constitute the same class of meta words.

61. A computer program product for use in conjunction with a computer system, the computer system for searching an index of a database of documents, the index having entries, each entry including an object identifier and a location list, each object identifier including at least one of a word and a meta word, each location list including one or more locations of the at least one of a word and a meta word of each corresponding object identifier, each entry associated with a meta word also including nesting level information for the meta word, the computer program product comprising a computer readable storage medium and a computer program mechanism embedded therein, the computer program mechanism comprising:

instructions for receiving a query that specifies one or more words to be found within a specified field within a document;

instructions for determining a start meta word and end meta word associated with the specified field;

instructions for identifying a bounding meta word by selecting one of the start meta word and end meta word;

instructions for searching the index to identify a first entry that has an object identifier associated with the specified words;

instructions for searching the index to identify a second entry that has an object identifier associated with the bounding meta word;

instructions for determining a bounding location from a closest occurrence of the bounding meta word with respect to the specified words, by comparing the location list of the second entry and the location list of the first entry;

instructions for identifying nesting level information for the bounding meta word at the bounding location;

instructions for identifying a complementary meta word to the bounding meta word having corresponding nesting level information as the identified nesting level information for the bounding meta word;

instructions for searching the index to locate a third entry that has an object identifier associated with the complementary meta word;

instructions for determining a complementary location from the location list of the third entry; and instructions for generating a result that indicates whether the specified words are within a first field, associated with the bounding meta word and the complementary meta word, by determining whether a location in the location list of the first entry falls between the bounding location and the complementary location.

62. The computer program product of claim 61, wherein the complementary location of the complementary meta word is opposite to the bounding location of the bounding meta word, relative to the specified words, in the index of the database of documents.

63. The computer program product of claim 61, wherein the first field is the specified field.

64. The computer program product of claim 61, wherein the instructions for determining a bounding location comprise instructions for determining a bounding location of the bounding meta word by applying first spatial criteria to the location list of the second entry and the location list of the first entry, and further wherein the computer program product includes instructions for repeating at least a plurality of the instructions for determining a bounding location, identifying nesting level information, identifying a complementary meta word, searching the index, determining a complementary location, and generating a result until a final a result is generated.

65. The computer program product of claim 64, wherein the final result is selected from the set consisting of (A) the specified words are found within the specified field, and (B) there is no instance of the specified words within the specified field.

* * * * *

UNITED STATES PATENT AND TRADEMARK OFFICE
CERTIFICATE OF CORRECTION

PATENT NO. : 6,963,869 B2 Page 1 of 1
APPLICATION NO. : 10/042028
DATED : November 8, 2005
INVENTOR(S) : Michael Burrows It is certified that error appears in the above-identified patent and that said Letters Patent is hereby corrected as shown below:

On the title page, item (54), in "Title", in column 1, line 3, delete "SUBJECT" and insert -- SUBSET --, therefor.

In column 1, line 3, delete "SUBJECT" and insert -- SUBSET --, therefor.

In column 4, line 37, delete "4C" and insert -- 4D --, therefor.

In column 4, line 43, delete "4C" and insert- -- 4D --, therefor.

In column 18, line 45, before "1300" delete "Wis".

In column 21, line 19, in Claim 3, delete "wherein each" and insert -- wherein, for each --, therefor.

In column 21, line 23, in Claim 4, after "wherein" insert -- , --.

In column 23, line 53, in Claim 20, delete "me a" and insert -- meta --, therefor.

Signed and Sealed this

Twenty-fifth Day of August, 2009

David J. Kappos
*Director of the United States Patent and Trademark Office*